(12) United States Patent
Hashiguchi et al.

(10) Patent No.: US 11,620,823 B2
(45) Date of Patent: Apr. 4, 2023

(54) INFORMATION PROCESSING APPARATUS, NON-TRANSITORY COMPUTER READABLE STORAGE MEDIUM, INFORMATION PROCESSING METHOD, AND SIGNAGE SYSTEM

(71) Applicant: Fast Retailing Co., Ltd., Yamaguchi (JP)

(72) Inventors: Yuka Hashiguchi, Yamaguchi (JP); Aya Sano, Yamaguchi (JP)

(73) Assignee: Fast Retailing Co., Ltd., Yamaguchi (JP)

( * ) Notice: Subject to any disclaimer, the term of this patent is extended or adjusted under 35 U.S.C. 154(b) by 63 days.

(21) Appl. No.: 17/082,845

(22) Filed: Oct. 28, 2020

(65) Prior Publication Data
US 2021/0133451 A1 May 6, 2021

(30) Foreign Application Priority Data

Nov. 1, 2019 (JP) .............................. JP2019-199516

(51) Int. Cl.
| | |
|---|---|
| *G06F 3/04817* | (2022.01) |
| *G06V 20/20* | (2022.01) |
| *G09G 5/377* | (2006.01) |
| *G06Q 10/087* | (2023.01) |
| *G06Q 30/0601* | (2023.01) |

(Continued)

(52) U.S. Cl.
CPC .......... *G06V 20/20* (2022.01); *G06F 3/04817* (2013.01); *G06Q 10/087* (2013.01); *G06Q 30/0281* (2013.01); *G06Q 30/0623* (2013.01); *G09F 9/30* (2013.01); *G09F 27/00* (2013.01); *G09G 5/377* (2013.01);

(Continued)

(58) Field of Classification Search
CPC ........ G06F 3/04817; G09F 9/30; G09F 27/00; G06Q 30/0277; G09G 2354/00; G09G 2380/04
See application file for complete search history.

(56) References Cited

U.S. PATENT DOCUMENTS 9,886,678 B2 * 2/2018 Yan ...................... G06Q 10/087
10,275,111 B2 * 4/2019 Ford ..................... G06F 3/0481
(Continued)

FOREIGN PATENT DOCUMENTS

| WO | WO-2012035191 A1 * | 3/2012 | .......... G01C 21/206 |
|---|---|---|---|
| WO | WO 2017-013690 A | 1/2017 | |

*Primary Examiner* — Antonio A Caschera
(74) *Attorney, Agent, or Firm* — Wolf, Greenfield & Sacks, P.C.

(57) ABSTRACT

An information processing apparatus for configuring a signage device acquires layout information including position information of at least one signage device in a target area and a floor plan which enables identification of placement of at least one fixture placed in the target area, and content information associated with content to be displayed on the signage device. The information processing apparatus displays an icon corresponding to the signage device at a position corresponding to position information in the floor plan. On receiving a selection of the icon from a user, the information processing apparatus displays content information set in the signage device or content information to be set in the signage device, which enhances the user-friendliness in checking or setting up configuration details.

10 Claims, 24 Drawing Sheets

(51) Int. Cl.
  G09F 9/30      (2006.01)
  G09F 27/00     (2006.01)
  G06Q 30/02     (2023.01)
  G06Q 30/0241   (2023.01)

(52) U.S. Cl.
  CPC ..... *G06Q 30/0277* (2013.01); *G09G 2354/00* (2013.01); *G09G 2380/04* (2013.01)

(56) References Cited

U.S. PATENT DOCUMENTS

| | | | | |
|---|---|---|---|---|
| 2008/0263467 | A1* | 10/2008 | Wilkins | G06F 3/0484 715/765 |
| 2012/0047011 | A1* | 2/2012 | Rippetoe | G06Q 30/0261 705/14.58 |
| 2013/0006790 | A1* | 1/2013 | Raskin | G06Q 10/04 705/26.1 |

* cited by examiner

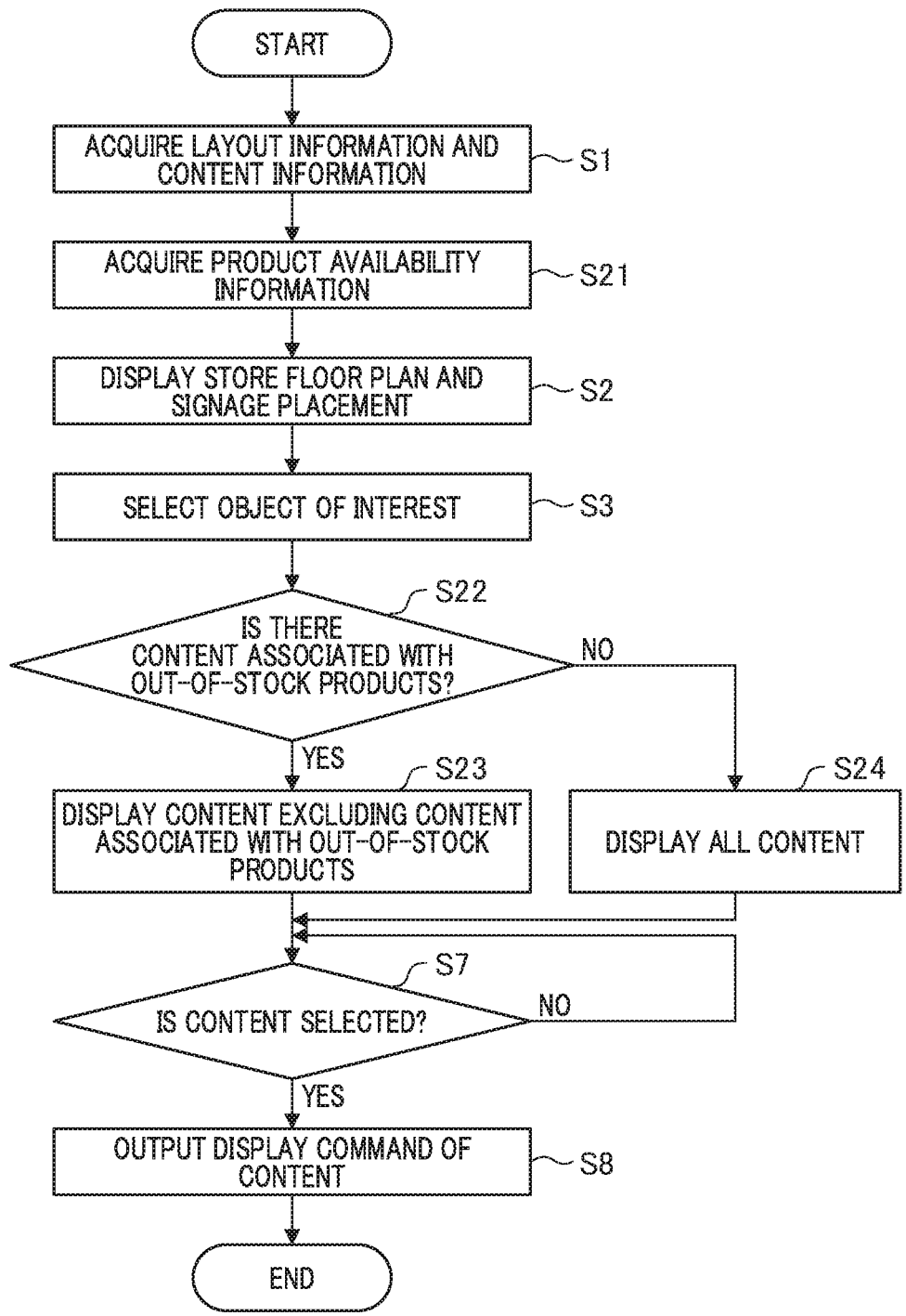

INFORMATION PROCESSING APPARATUS, NON-TRANSITORY COMPUTER READABLE STORAGE MEDIUM, INFORMATION PROCESSING METHOD, AND SIGNAGE SYSTEM

CROSS REFERENCE TO RELATED APPLICATION

The present application claims priority to Japanese Application No. 2019-199516, filed Nov. 1, 2019. The aforementioned application is hereby incorporated by reference herein.

BACKGROUND

Field of the Invention

The present invention relates to an information processing apparatus, a non-transitory computer readable storage medium, an information processing method, and a signage system.

Description of the Related Art

In recent years, digital signage (digital advertising display) has gain widespread use in product advertisement. Digital signage causes a display (signage device) installed in a store to show content such as static images and videos. In such digital signage, it is possible to freely set details to be shown on the display from multiple pieces of content and to change the details by time of day. WO 2017/013690 A discloses a signage system that causes a display to show content of product advertisement according to a predetermined schedule.

However, in selecting details to be displayed on a signage in a store from multiple pieces of content, it is difficult to set the content with consideration of store layout.

SUMMARY

According to some embodiments of the present invention is to provide an information processing apparatus that enables configuration of a signage with consideration of a store layout.

In order to solve the problems, an embodiment of the present disclosure provides an information processing apparatus for configuring a signage device, the information processing apparatus including: an acquisition unit configured to acquire layout information including position information of at least one signage device in a target area and a floor plan which enables identification of placement of at least one fixture placed in the target area, and content information associated with content to be displayed on the signage device; and a display control unit configured to show an icon corresponding to the signage device at a position corresponding to the position information in the floor plan, in which, when the display control unit receives a selection of the icon from a user, the display control unit shows content information set in the signage device or shows content information to be set in the signage device.

BRIEF DESCRIPTION OF DRAWINGS

FIG. 6 is a flowchart illustrating an example of processing according to a second embodiment;

DESCRIPTION OF THE EMBODIMENTS

Hereinafter, embodiments of the present invention will be described with reference to the drawings.

First Embodiment

Figure 1:
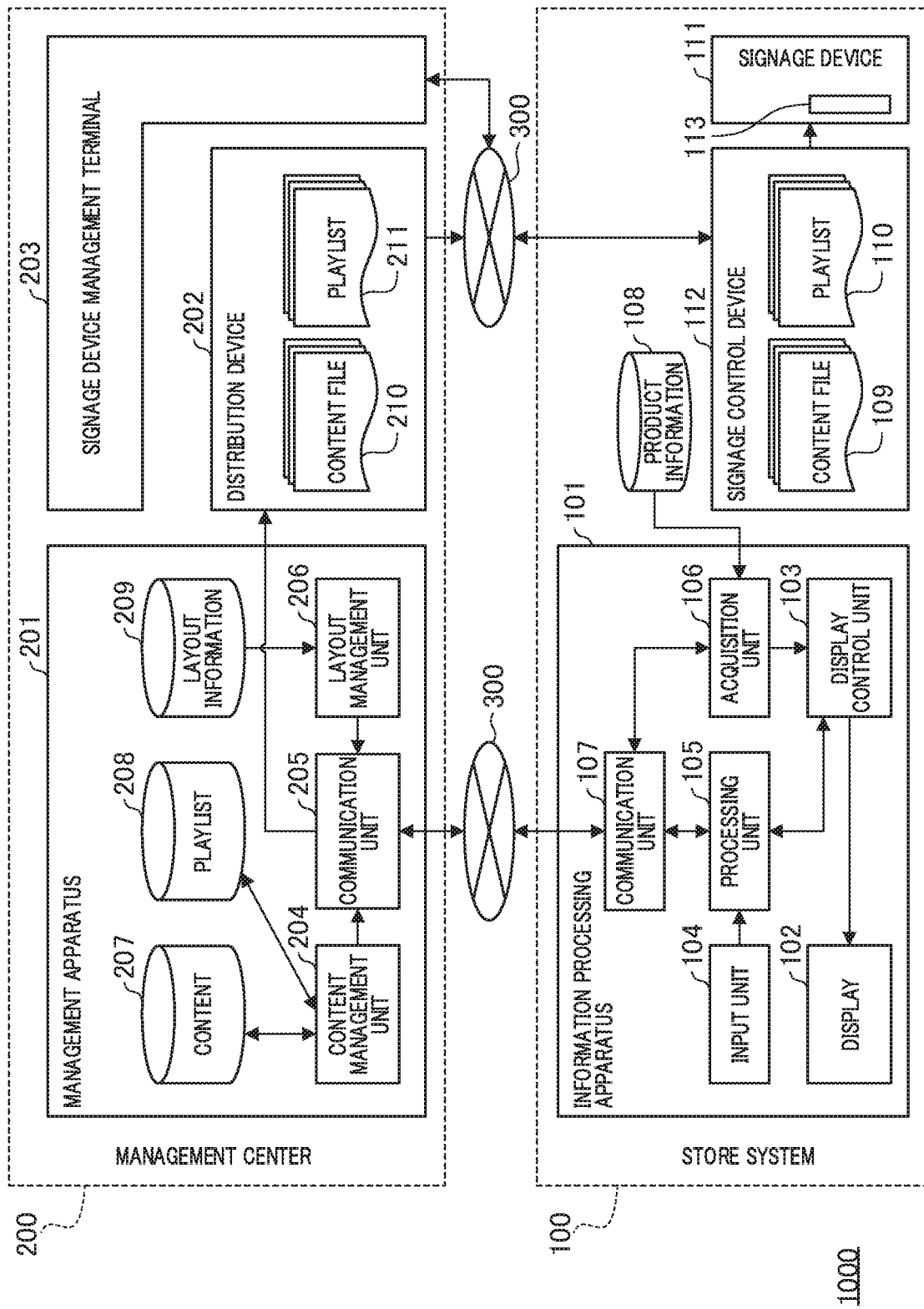
FIG. 1 is a configuration diagram of a display system including an information processing apparatus according to a first embodiment.

FIG. 1 is a block diagram schematically illustrating a signage system 1000. The signage system 1000 is for displaying content such as digital advertisements on signage devices 111 placed in a store. The signage system 1000 includes, for example, a store system 100 and a management center 200 which are communicably connected through a network 300. Examples of the network 300 include the Internet, a wide area network (WAN), a local area network (LAN), a wireless base station, a provider device, and a dedicated line.

When there are a plurality of stores, the store system 100 is installed for each store, but herein, a single store system will be described for the simplicity's sake. The management center 200 includes, for example, a management apparatus 201, a distribution device 202, and a signage device management terminal 203. The management apparatus 201 holds original data files to be digitally displayed in a store as content 207 in, for example, a memory 23 to be described. The content 207 includes information such as content titles, languages, information on related products, distributable date ranges, and types of distributable signage devices. In addition, the management apparatus 201 holds a playlist 208 showing which content is to be shown in what order and holds layout information 209 showing a layout sketch of each store. The playlist 208 includes information such as campaign names, target regions, content, playing orders, times and dates of playing, and date ranges of playing. The layout information 209 includes image data (floor plans) that schematically shows, for example, locations of stores (including country names and store names), store numbers, store types, the placement of walls and fixtures (erectors) and positions of pillars in stores and also includes position information of the signage devices 111 to be described. The position information of the signage devices 111 includes information indicating where the signage devices 111 are placed on a floor plan and to which directions the signage devices 111 are facing on a floor plan. In other words, the position information of the signage devices 111 indicates positions in a store where the signage devices 111 are placed.

The management apparatus 201 may further include a content management unit 204, a communication unit 205, and a layout management unit 206. For example, the content management unit 204 acquires the content 207 and the playlist 208 based on instructions from the store system 100 received by the communication unit 205 and outputs the content 207 and the playlist 208 to the communication unit 205. The communication unit 205 transmits the output content 207 and playlist 208 to an information processing apparatus 101 or the distribution device 202. The management apparatus 201 is a PC or a tablet terminal. A user interface to be described may be provided on an application in a browser driven by the management apparatus 201. The user interface will be described later by simply describing processing provided by the information processing apparatus 101.

For example, the layout management unit 206 acquires the layout information 209 based on instructions from the store system 100 received by the communication unit 205 and outputs the layout information 209 to the communication unit 205. The communication unit 205 transmits the output layout information 209 to the information processing apparatus 101.

The distribution device 202 distributes the content 207 and the playlist 208 received from the communication unit 205 through the network 300 to a signage control device 112 of the store system 100 which is to be described.

The signage device management terminal 203 performs, for example, remote control, setting control, and usage information collection with respect to the signage devices 111.

In this embodiment, the management apparatus 201, the distribution device 202, and the signage device management terminal 203 are described as separate bodies but may be combined in an integrated manner.

The store system 100 includes the information processing apparatus 101, the signage control device 112, and the signage devices 111. The information processing apparatus 101 is, for example, a smartphone, a tablet terminal, a notebook personal computer (PC), a desktop PC, a mobile phone, and a personal digital assistant (PDA). In this embodiment, the information processing apparatus 101 is described, for example, as a tablet terminal. The information processing apparatus 101 includes, for example, a display 102, a display control unit 103, an input unit 104, a processing unit 105, an acquisition unit 106, and a communication unit 107.

The communication unit 107 of the information processing apparatus 101 acquires the layout information 209, the playlist 208, and the content 207 from the management apparatus 201 through the network 300 and transmits instructions from the processing unit 105 to the management apparatus 201.

The processing unit 105 executes a program that implements processes in a flow to be described later, and then, the processing unit 105 causes the display control unit 103 to show, on the display 102, the user interface based on the layout information 209 and receives settings of the signage devices 111.

The display 102 is a display device such as a liquid crystal display panel, a plasma display panel, or an organic electro luminescence (EL) display panel. The display 102 shows an image such as the user interface under the control of the display control unit 103. The display control unit 103 controls the display 102 to show the user interface image based on instructions from the processing unit 105, for example. The input unit 104 is, for example, a touch panel, a keyboard, and a mouse that receives operation inputs from a user. The input unit 104 receives instructions or inputs from a user through a touch panel or a key. In a case where the information processing apparatus 101 is a tablet terminal, the input unit 104 may also function as the display 102, and the display 102 and the input unit 104 may have a combined structure. The acquisition unit 106 acquires product information 108 from a database.

According to configurations in the information processing apparatus 101, the management apparatus 201 transmits a content file and a playlist corresponding to the configurations from the distribution device 202 to the signage control device 112. The signage control device 112 controls the signage devices 111.

The signage devices 111 are installed in indoor or outdoor areas of a clothing store, a shopping mall, a station, an airport, or a hotel. Each signage device 111 includes a display 113 such as a liquid crystal display panel, a plasma display panel, and an organic EL display panel and shows content such as an image on the display 113 under the control of the signage control device 112. The content shown on the display 113 is, for example, an advertising image or video. The signage devices 111 play and show details set based on the content file and the playlist held in the signage control device 112. In this embodiment, each signage device 111 and the signage control device 112 are described as separate bodies but may be a combined device. This embodiment will be described assuming that one or more signage devices 111 are installed in a store (target area) of a clothing store.

Figure 2:
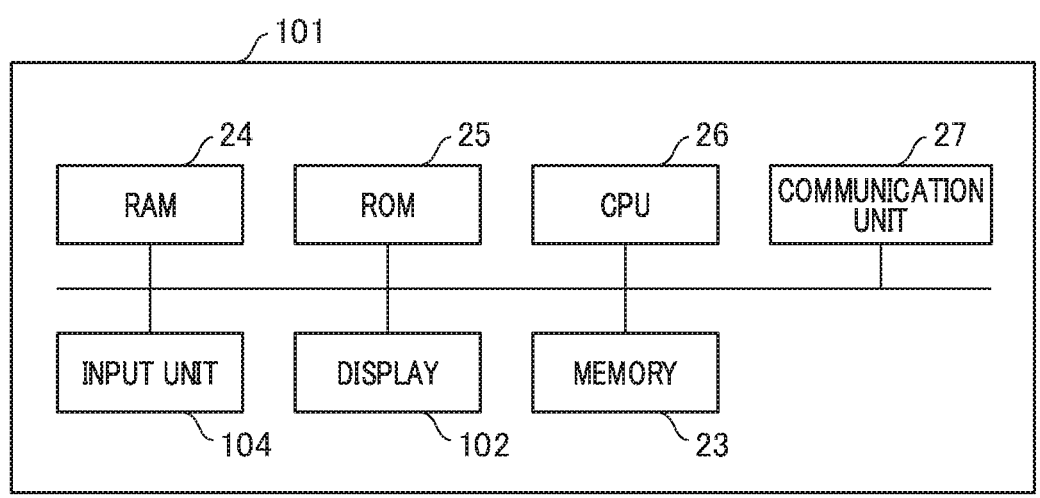
FIG. 2 is a block diagram illustrating a hardware configuration of the information processing apparatus according to the first embodiment.

FIG. 2 is a hardware configuration diagram of the information processing apparatus 101. The management apparatus 201 and the signage control device 112 have a similar hardware configuration, but the information processing apparatus 101 will be described for simplicity's sake. The information processing apparatus 101 includes the memory 23, a RAM 24, a ROM 25, a CPU 26, a communication unit 27, the display 102, and the input unit 104.

The memory 23 stores, for example, a program executed by the CPU 26 to be described later and data used by the program.

The CPU 26 operates based on a program stored in the ROM 25 or the memory 23 and controls each unit of the information processing apparatus 101. The ROM 25 stores, for example, a boot program executed by the CPU 26 when the information processing apparatus 101 is started up and a program dependent on the hardware of the information processing apparatus 101. The CPU 26 executes, for example, a program loaded on the RAM 24 to implement processes of the flow to be described. Note that the CPU 26 may acquire these programs from another device through the network 300 and execute the programs.

The communication unit 27 receives data from another device through the network 300, sends the data to the CPU 26, and transmits the data and instructions prepared by the CPU 26 to the device through the network 300.

Hardware configurations of the signage devices 111, the signage control device 112, the management apparatus 201, the distribution device 202, and the signage device management terminal 203 will not be described, but note that these hardware configurations are substantially equal to that of the information processing apparatus 101.

Figure 3:
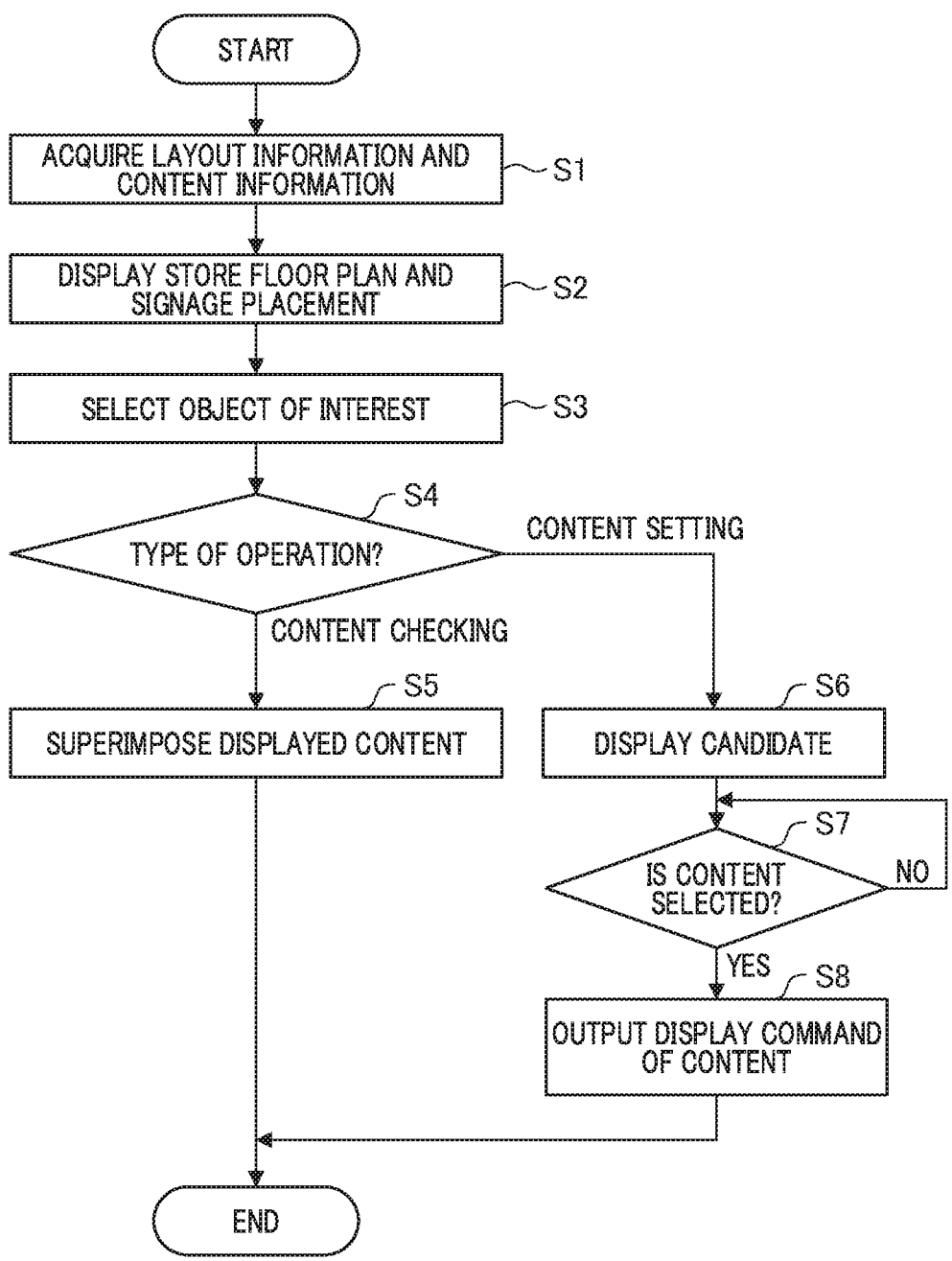
FIG. 3 is a flowchart illustrating an example of processing according to the first embodiment.

FIG. 3 is a flowchart illustrating an example of processing according to the first embodiment. First, the acquisition unit 106 acquires the layout information 209 output from the management apparatus 201 (S1). The acquisition unit 106 also acquires content information output from the management apparatus 201. The content information includes the content 207 and the playlist 208.

Figure 4A:
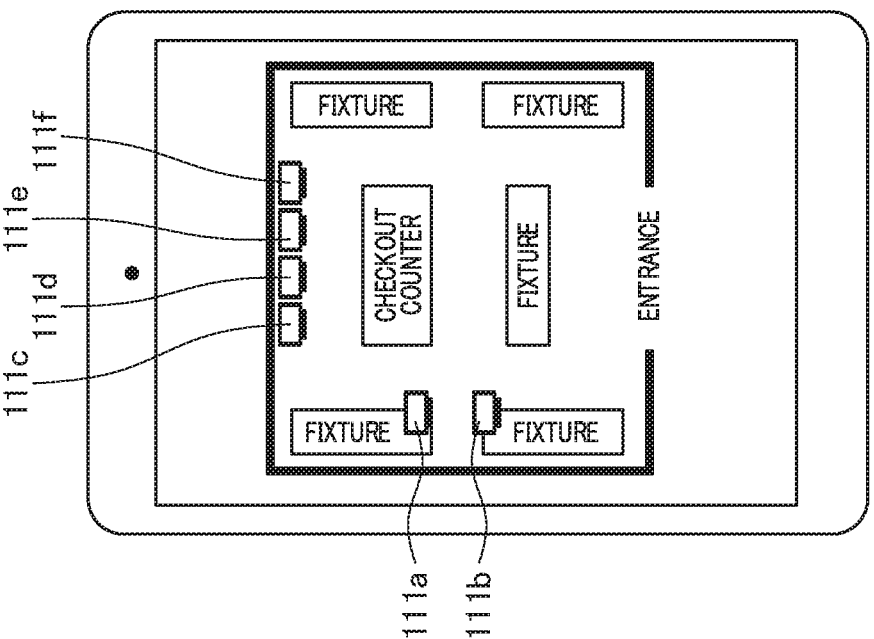
FIGS. 4A and 4B are views illustrating examples of floor plans according to the first embodiment.
Figure 4B:
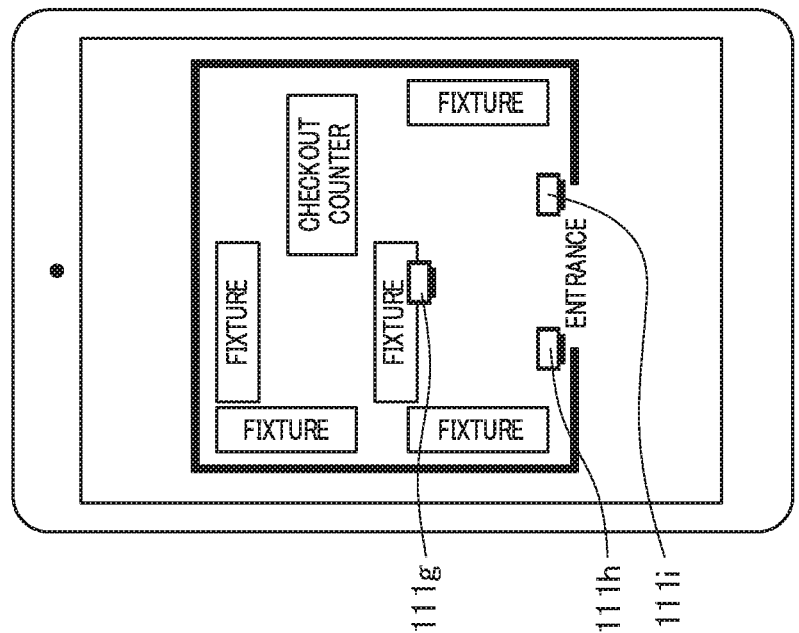

Next, the display control unit 103 causes the display 102 to show a floor plan of the store based on the layout information 209 acquired in S1 and positions (installation positions) of the signage devices 111 on the floor plan (S2). Specifically, the display control unit 103 causes the display 102 to show icons corresponding to the one or more signage devices 111 installed in the store at positions corresponding to the installation positions of the signage devices 111 on the floor plan. FIGS. 4A and 4B are views illustrating examples of floor plans according to the first embodiment. FIGS. 4A and 4B illustrate floor plans of different stores. FIG. 4A illustrates a floor plan of a store with six signage devices and five fixtures installed. FIG. 4B illustrates a floor plan of a store with three signage devices and five fixtures installed. As illustrated in FIGS. 4A and 4B, icons 111a to 111i corresponding to the signage devices are displayed on the floor plans. A floor plan of a store shown on the display 102 includes a sketch plan of the placement of fixtures and checkout counters in the store. The display 102 may further show the placement of columns, doors, or fitting rooms to make it easier to recognize the layout of the store. The floor plan enables identification of the installation positions of the one or more signage devices 111 in the store and the placement of fixtures and the like.

Returning to FIG. 3, a signage device to be operated by the processing unit 105 is selected based on an input by a user using the input unit 104 such as a touch panel (S3). The floor plan illustrated in FIG. 4A will be taken as an example and specifically described. For example, when a user selects the signage device icon 111d, the processing unit 105 selects a signage device corresponding to the icon 111d as an object of interest. After that, the processing unit 105 determines the type of operation performed on the signage device of interest (S4).

Figure 5B:
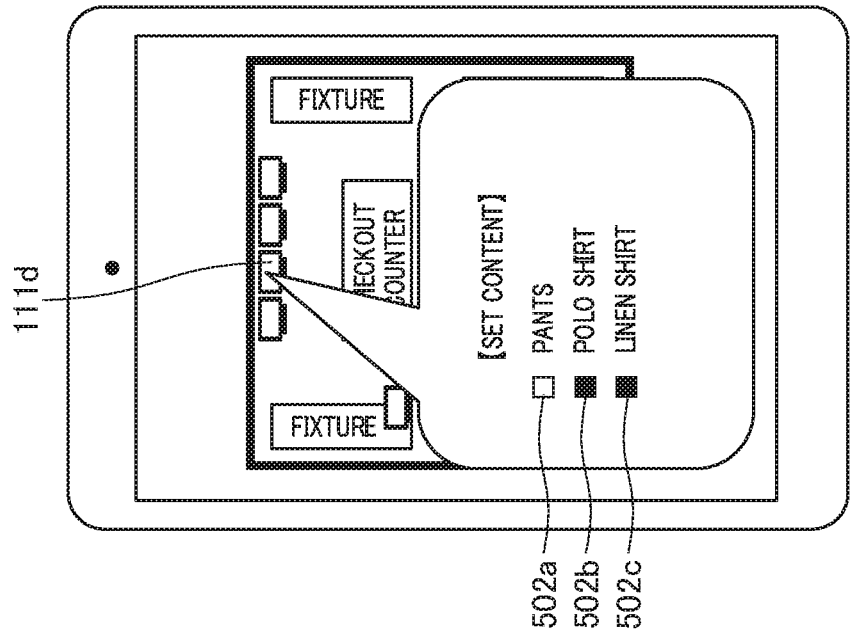
FIGS. 5A and 5B are views illustrating examples of display screens based on operations according to the first embodiment.
Figure 5A:
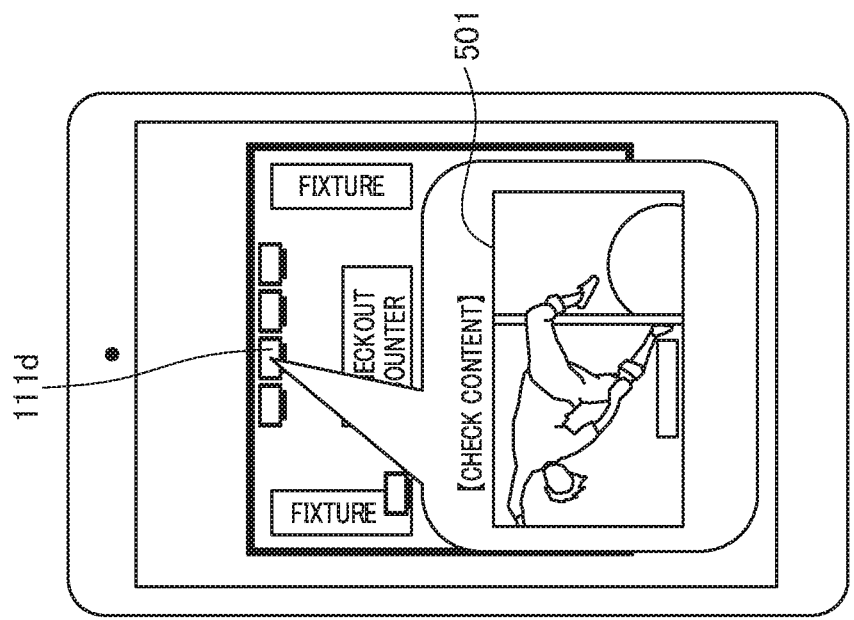

When content checking is performed on the signage device of interest, based on an instruction from the processing unit 105, the display control unit 103 superimposes, on a display screen, details of content currently displayed on the signage device of interest, that is, content set in the signage device of interest (S5). FIGS. 5A and 5B are views illustrating examples of display screens based on operations according to the first embodiment. FIG. 5A is an example of a display screen when content checking is performed. As illustrated in FIG. 5A, in content checking, the display control unit 103 superimposes, on the floor plan, a detail-of-content 501 currently displayed on the signage device of interest. In FIG. 5A, the detail-of-content 501 is displayed within a balloon from the icon 111d. Such a display format makes it possible for a user to intuitively understand which signage device is to be operated. Note that the manner of display is not limited to one using a balloon as long as it is possible for a user to understand which signage device is associated with displayed details of content.

Returning to FIG. 3 again, when content setting is performed on the signage device of interest, the display control unit 103 superimposes, on a display screen, candidates of content to be displayed on the signage device of interest (S6). FIG. 5B is an example of a display screen when content setting is performed. As illustrated in FIG. 5B, in content setting, the display control unit 103 superimposes candidates 502a to 502c of to-be-displayed content on the display screen. A user uses the input unit 104 to select content to be displayed on the signage device of interest from one or more displayed candidates. As an example, herein, the candidate 502a (content associated with the product "pants") shown with an open square is selected. Similarly to the detail-of-content 501, note that the manner of display of the candidates 502a to 502c is not limited to one using a balloon as long as it is possible for a user to understand which signage device is associated with displayed details of candidate.

The display order of content, or the display order of the candidates 502a to 502c, may be determined based on, for example, the product information 108 acquired by the acquisition unit 106. Specifically, for example, content associated with products with sufficient quantities in stock or products to be delivered soon may be displayed at the top. This makes it easier for a user to select content associated with products with sufficient quantities in stock or newly arrived products.

Returning to FIG. 3 again, the processing unit 105 then determines whether content is selected by a user (S7). When content is selected, the processing unit 105 outputs a command to display the selected content on the signage device of interest.

According to this embodiment, it is possible to easily configure a signage device with consideration of a store layout.

Second Embodiment

FIG. 6 is a flowchart illustrating an example of processing according to a second embodiment. In this embodiment, candidates are displayed on a display screen based on product availability information of a store during content setting. Note that S1 to S3, S7, and S8 in this figure are substantially equal to those steps in FIG. 3 and will not be described in this embodiment. Furthermore, similar components to those described in the aforementioned embodiment are designated by the same reference numerals and the description thereof will be omitted.

In S21, an acquisition unit 106 acquires product availability information of a store from, for example, a product management database in the store. The product availability information may be acquired from, but not limited to, an external device or the like. In S22, a processing unit 105 determines whether content to be displayed, or content to be set, on a signage device of interest includes content associated with out-of-stock products. When the content associated with out-of-stock products is included, a display control unit 103 excludes the content associated with out-of-stock products and displays candidates on a display screen (S23). In other words, the display control unit 103 superimposes content associated with in-stock products as the candidates on a floor plan and displays the candidates. On the other hand, when the content associated with out-of-stock products is not included, the display control unit 103 shows all content to be set in the signage device as the candidates on the display screen (S24).

Such processing prevents content associated with out-of-stock products in a store to be displayed on a signage device installed in the store.

When there is a change in stock status, note that the status may be shown on a display 102 by, for example, pop-up. This makes it possible to quickly change configurations of a signage device, for example, on the arrival of new products.

Third Embodiment

Figure 7:
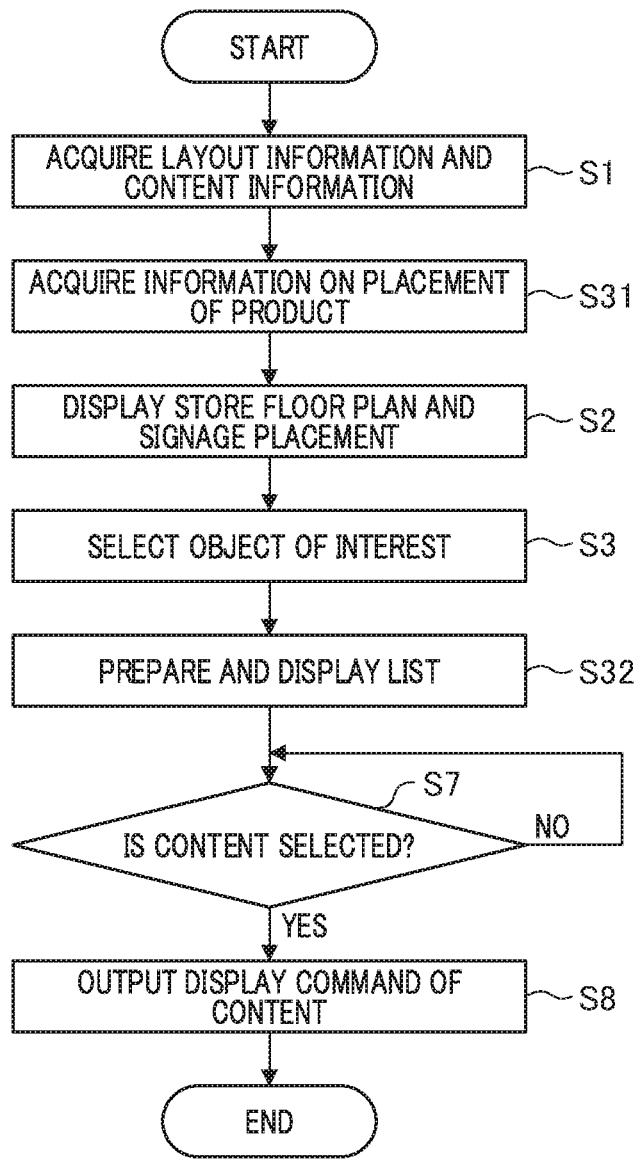
FIG. 7 is a flowchart illustrating an example of processing according to a third embodiment.

FIG. 7 is a flowchart illustrating an example of processing according to a third embodiment. In this embodiment, candidates are displayed on a display screen based on information associated with products placed around a signage device of interest during content setting. Note that S1 to S3, S7, and S8 in this figure are substantially equal to those steps in FIG. 3 and will not be described in this embodiment. Furthermore, similar components to those described in the aforementioned embodiments are designated by the same reference numerals and the description thereof will be omitted.

In S31, an acquisition unit 106 acquires information associated with products placed in a store (information on the placement of products) from, for example, a product management database in the store. The information on the placement of products may include, for example, the placement (display positions) of the products in the store and information on intervals between signage devices. The information on the placement of products may be acquired from, but not limited to, an external device or the like. When a floor plan of the store is displayed on a display 102 (S2), it is preferable that floor plan should enable a user to understand which product is displayed on which fixture.

Next, a processing unit 105 prepares a content candidate list based on a positional relation between the signage device of interest and the products placed in the store (S32). In the candidate list, for example, content associated with products closer to the signage device of interest ranks higher on the list. A display control unit 103 shows the prepared list on a display screen.

Accordingly, content associated with products on display near a signage device of interest can be easily shown on the signage device of interest, which eventually improves advertising effects of the signage device.

Fourth Embodiment

In a fourth embodiment, a processing unit 105 has one or more modes which are used to configure a signage device. Note that similar components to those described in the aforementioned embodiments are denoted by the same reference numerals and the description thereof will be omitted.

Figure 8:
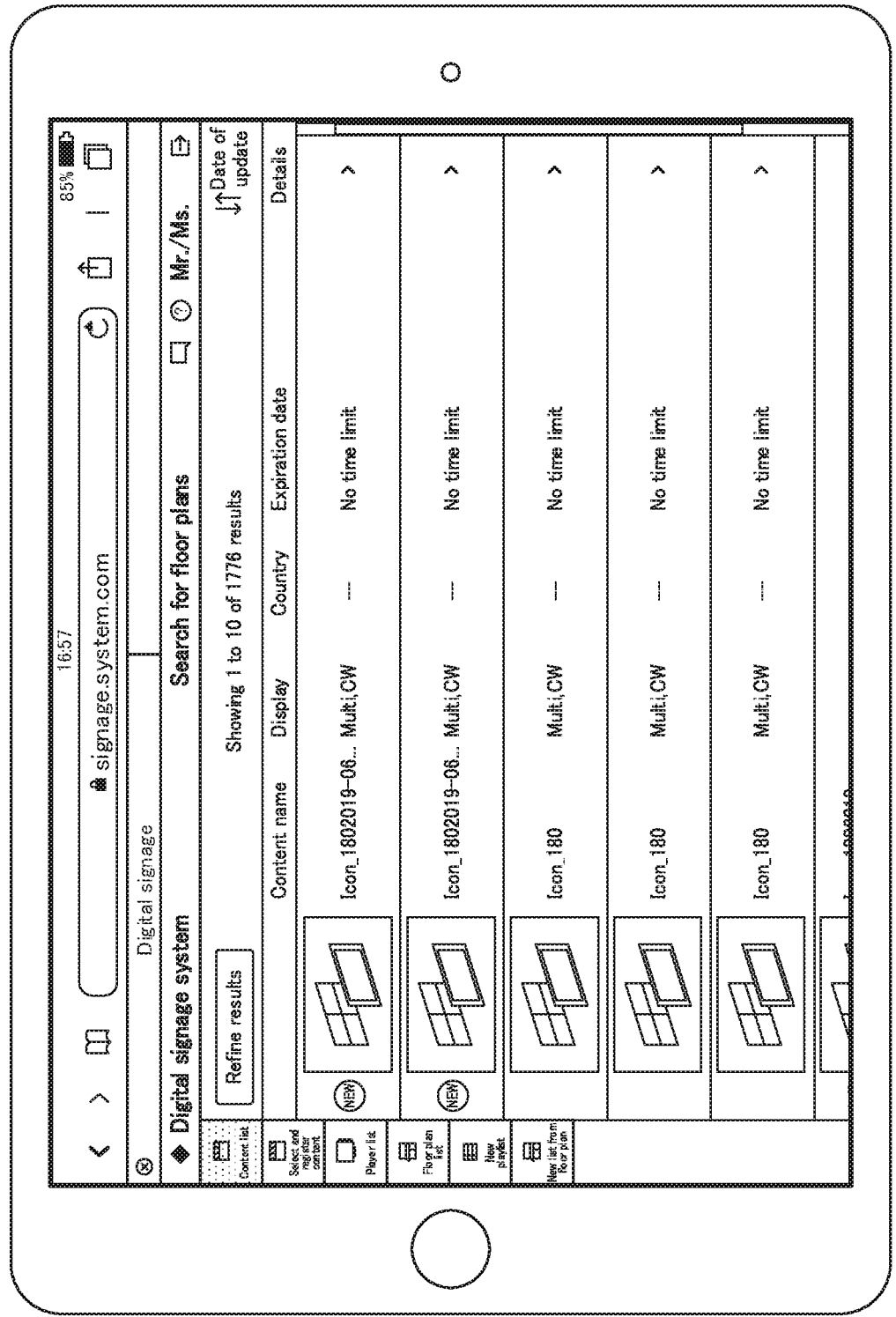
FIG. 8 illustrates an example of a display screen according to a fourth embodiment.

FIG. 8 illustrates an example of a display screen according to the fourth embodiment. A group of operation icons on the left of the screen is used for switching modes of a signage configuration system. The operation icons are shown here in the following order from the top: "Content list", "Select and register content", "Player list", "Floor plan list", "New playlist", and "New list from floor plan". For example, when a touch panel is employed as an input unit 104, a user touches one of the group of operation icons to change modes. When a mouse is employed as the input unit 104, a user points the cursor at an operation icon and clicks the icon to change modes. When a keyboard is employed as the input unit 104, a user selects an operation icon with a key to change modes.

The group of operation icons is shown in such an order that the signage device can be configured roughly when the modes are switched (selected) from the top in sequence. Even when a user forgets the operation procedure, such a display format enhances the user-friendliness of the signage device.

FIG. 8 illustrates an example of a display screen when Content list mode is selected. When a user selects the operation icon named "Content list", the mode is changed to Content list mode. In Content list mode, it is possible to understand all content (group of content) which is currently held by a management apparatus 201 and is to be set in any of one or more signage devices installed in a store. In addition, it is possible to check details of content, for example, by viewing the content.

As illustrated in FIG. 8, for example, an icon "NEW" may be displayed next to newly added content. Such a display format enables a user to intuitively understand newly added content.

In FIG. 8, for example, the content are displayed, but not limited, in order of date of update. According to inputs from a user, the display order may be changed in order of, for example, content name, display name, name of country where content is to be distributed, and expiration date. In addition, a keyword or the like may be input to enable searching of desired content from the content list. This makes it easy for a user to search for desired content in the list.

Figure 9:
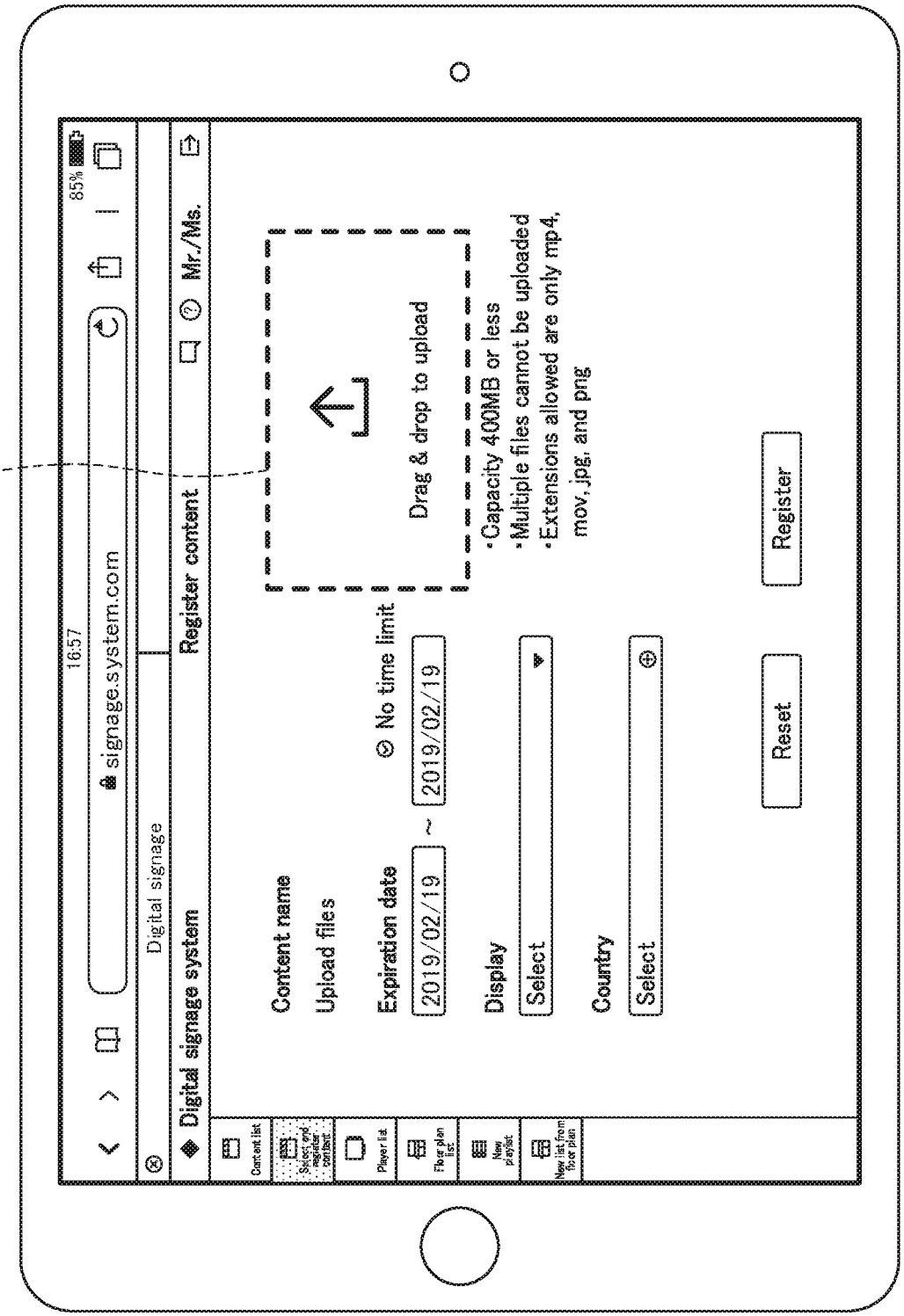
FIG. 9 illustrates an example of a display screen when Select and register content mode is selected.

If desired content is not found in Content list mode, a user selects Select and register content mode and registers video files or image files as content in a management center 200. FIG. 9 illustrates an example of a display screen when Select and register content mode is selected. When a user selects the operation icon named "Select and register content", the mode is changed to Select and register content mode. In Select and register content mode, for example, a user selects video files or image files and drags and drops the selected files in a predetermined area 900 on the screen so as to register the files as content in the management center 200. Note that a method of content registration is not limited to this example, and the following example may also be employed. That is, a user selects a predetermined icon displayed on the screen so that files stored in an information processing apparatus 101 are displayed selectively, and then, the user selects a file from the displayed files so as to register the selected file in the management center 200.

Even when the management center 200 does not hold content desired by a user, Select and register content mode enables the user to newly register the desired content in the management center 200. Accordingly, it is possible to display content desired by a user on a signage device.

Figure 10:
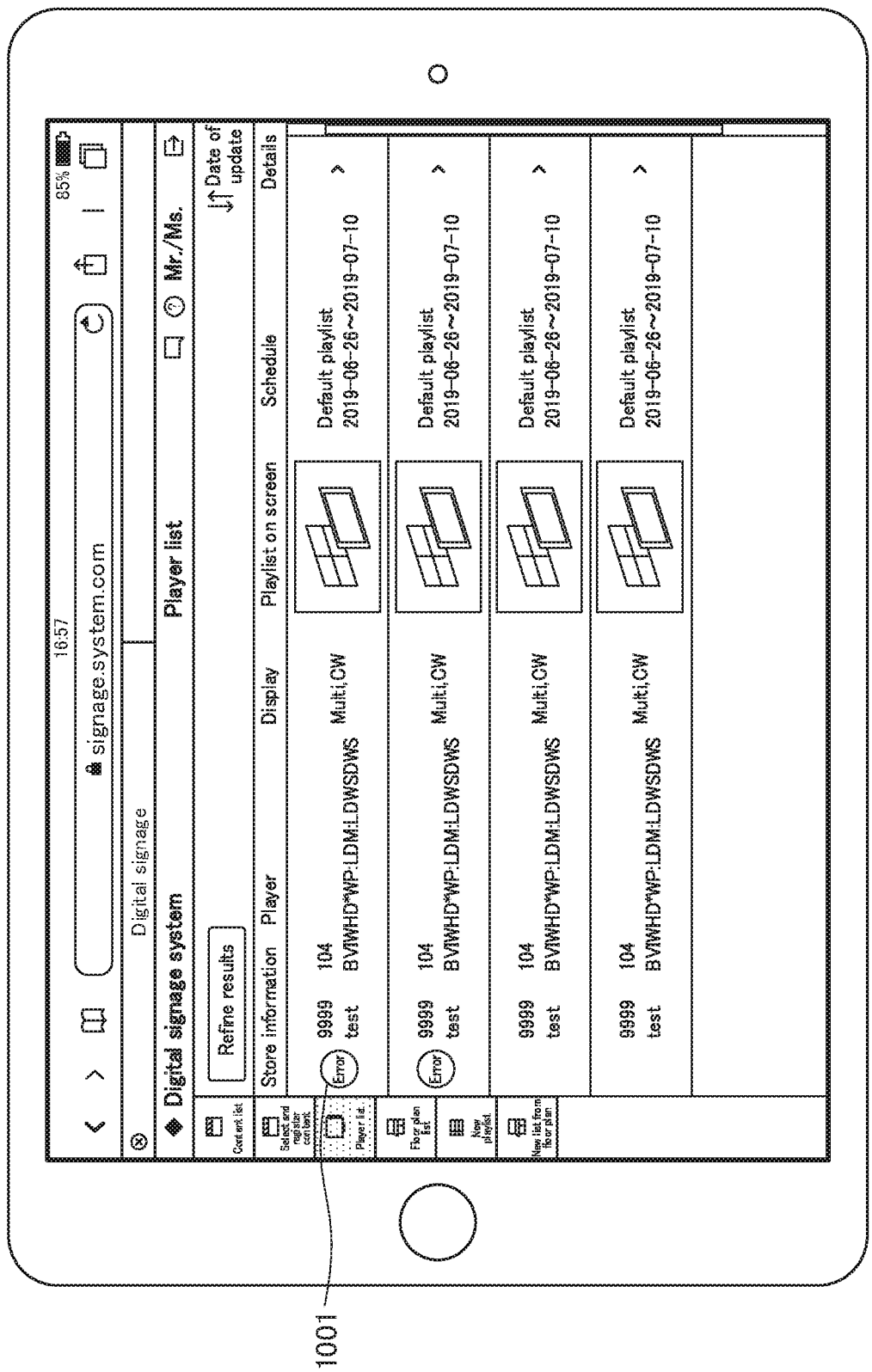
FIG. 10 illustrates an example of a display screen when Player list mode is selected.

FIG. 10 illustrates an example of a display screen when Player list mode is selected. When a user selects the operation icon named "Player list", the mode is changed to Player list mode. In Player list mode, the screen shows players (signage devices) where content can be set, that is, one or more signage devices installed in a store. In Player list mode, for example, it is possible to understand details of each signage device. The details of a signage device include configuration status of the signage device including a set playlist or content, monitor size and type of the signage device, and the presence or absence of errors.

In Player list mode, for example, it is possible to search for a signage device of interest by narrowing down players to be set with keywords or the like. Furthermore, for example, the players to be set may be narrowed down by playlists or content shown on screens or by schedules (times and dates) of the playlists or content. Still further, the store may be divided into a plurality of areas or floors to make it possible to refine the players per area.

As illustrated in FIG. 10, for example, an icon 1001 that can be used to identify an error at a glance may be displayed beside a signage device with an error. Such a display format enables a user to easily recognize a signage device with an error.

Figure 11:
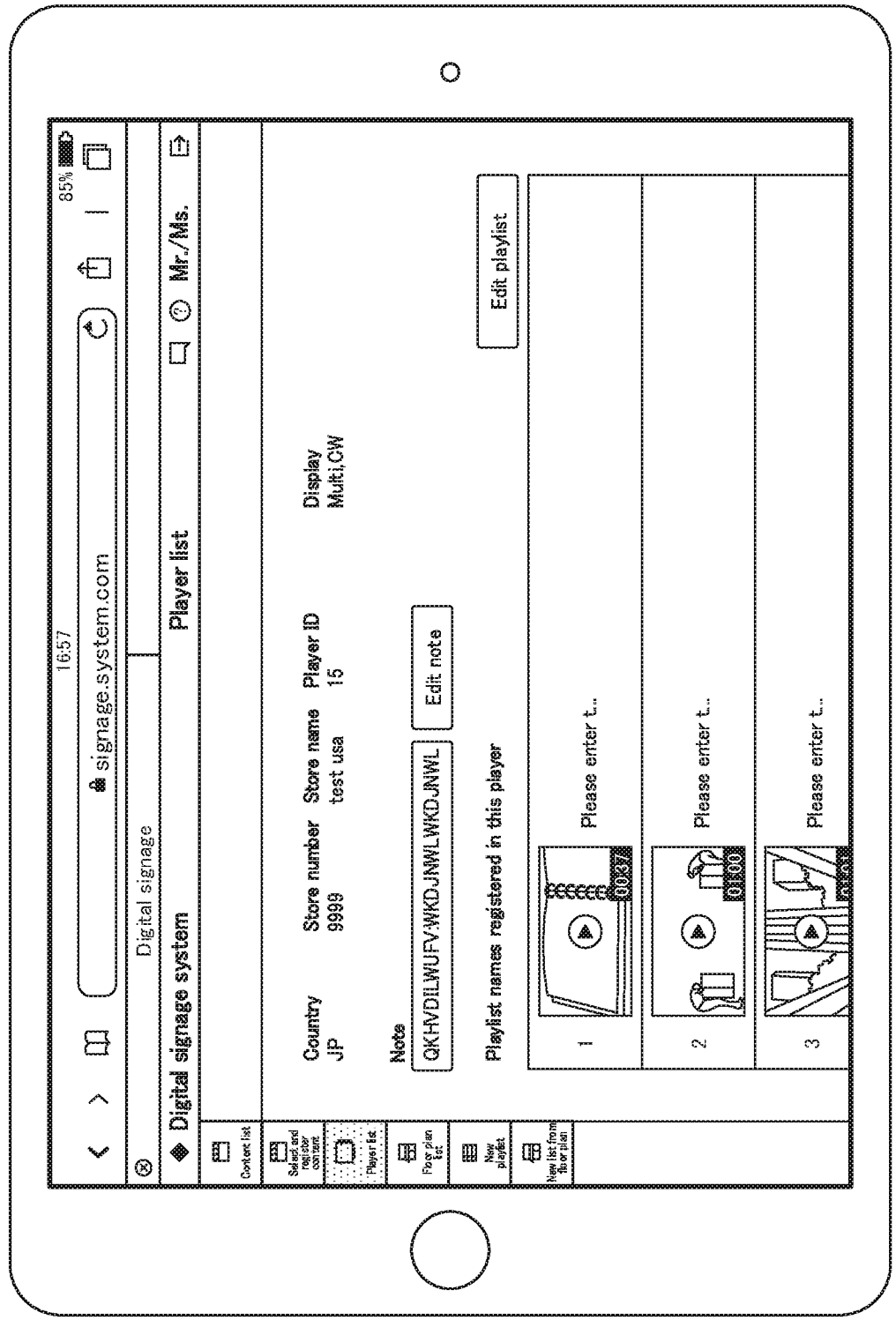
FIG. 11 illustrates an example of a display screen when a player is selected in Player list mode.

In addition, when a user selects a player from displayed player lists to check configuration details such as details of a set playlist, it is possible to check configuration details of the player. FIG. 11 illustrates an example of a display screen when a player is selected in Player list mode. As illustrated in FIG. 11, for example, it is possible to confirm details of a playlist or details of a note (special mention) set in the selected player.

In Player list mode, it is also possible to edit the set playlist. For example, a user can edit the playlist by selecting "Edit playlist" shown on the screen with the input unit 104.

Figure 12:
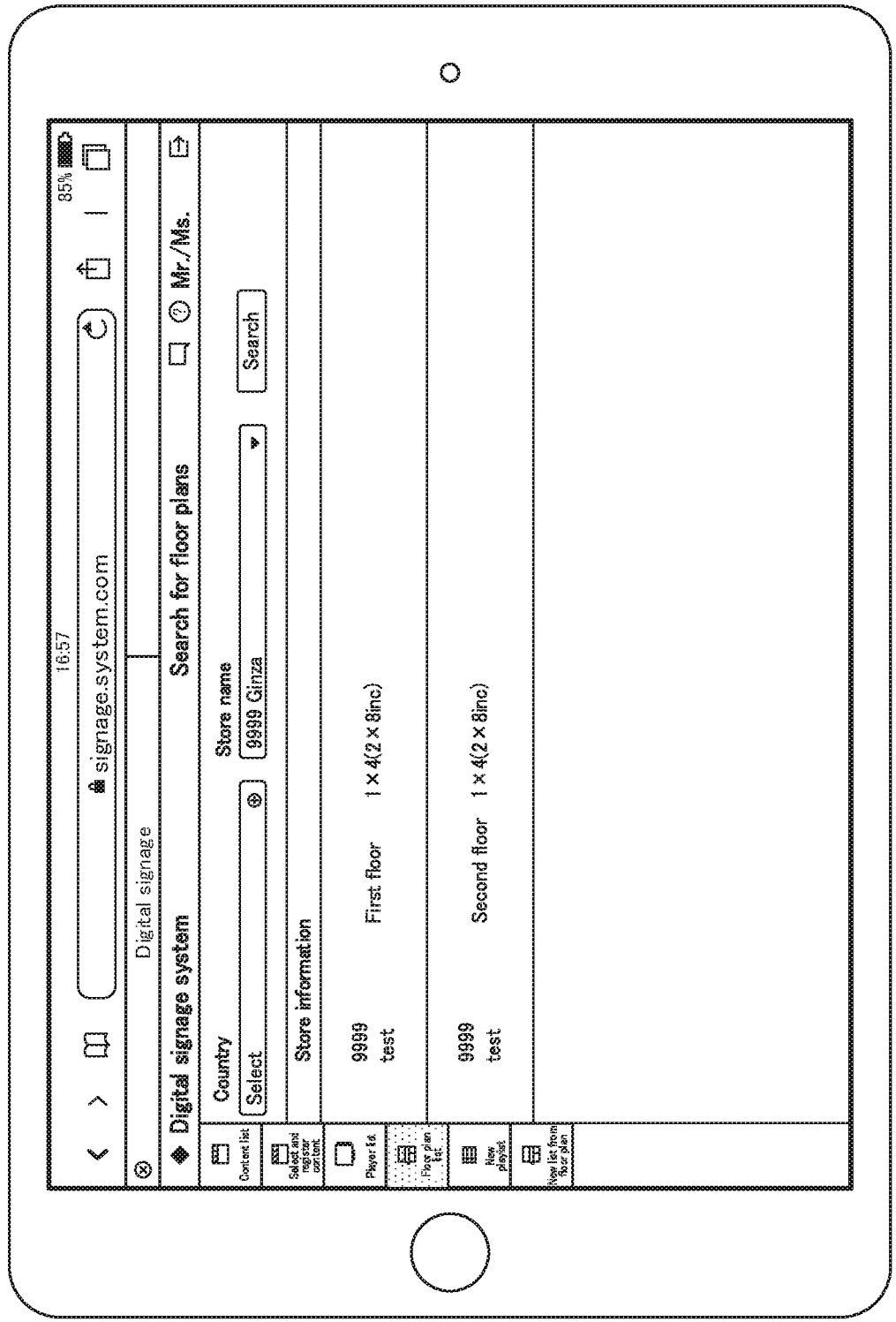
FIG. 12 illustrates an example of a display screen when Floor plan list mode is selected.

FIG. 12 illustrates an example of a display screen when Floor plan list mode is selected. When a user selects the operation icon named "Floor plan list", the mode is changed to Floor plan list mode. In Floor plan list mode, it is possible to configure a signage device based on floor plans of a specific store. In Floor plan list mode, for example, a floor plan list of a store is searched from country names such as Japan and the United States where signage devices are to be installed, in other words, from countries where the store is located, or from store names and store numbers. Layout information held by the management apparatus 201 includes metadata such as store names and store numbers, and what is shown is a list of layout information that includes metadata corresponding to search conditions. The layout information is provided, for example, per floor. Herein, the first floor and the second floor are displayed as an example of options.

Figure 13:
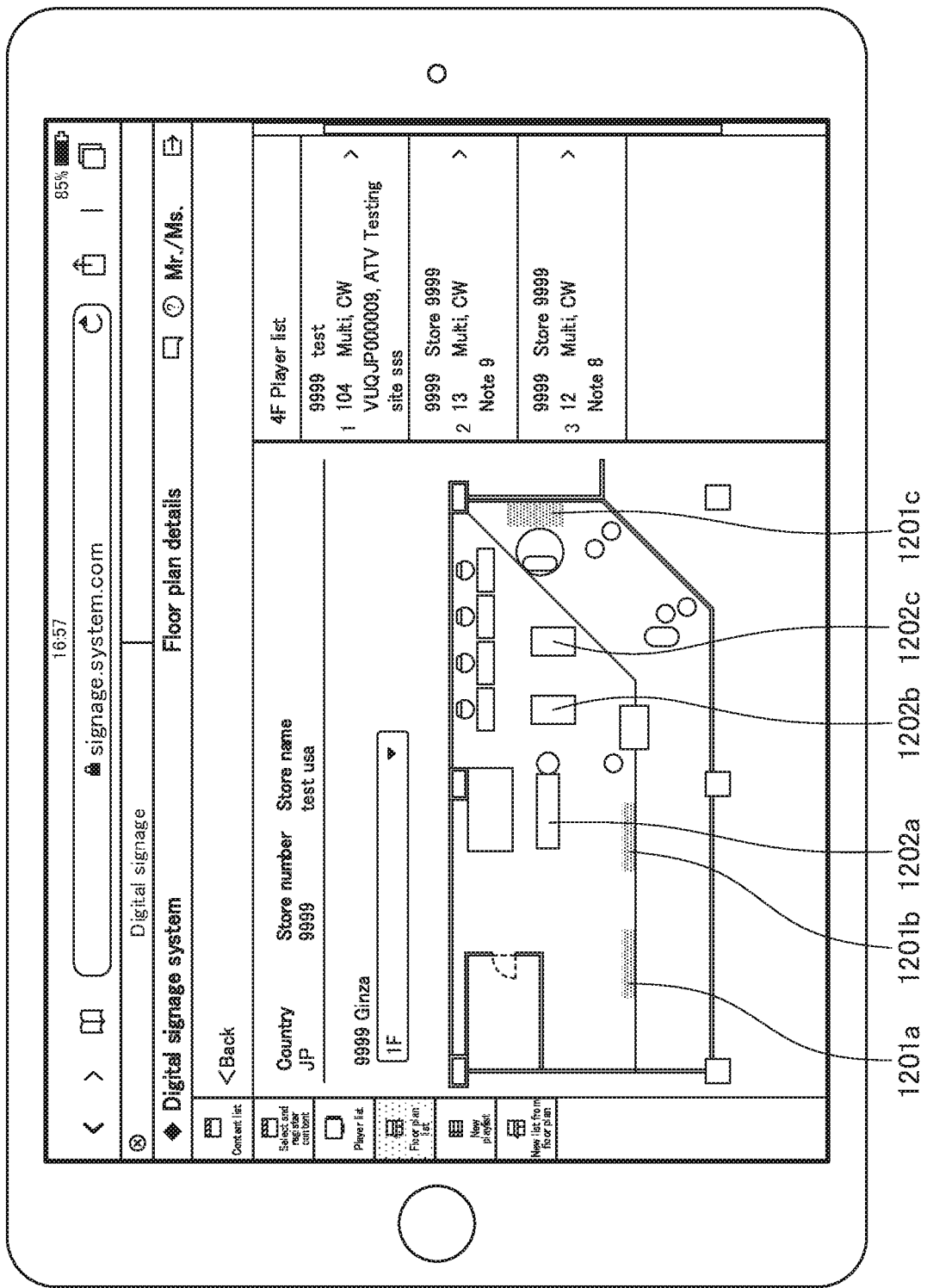
FIG. 13 illustrates an example of a display screen when a specific floor is selected in Floor plan list mode.

FIG. 13 illustrates an example of a display screen when a specific floor is selected in Floor plan list mode. Assumed that a user selects the first floor. As illustrated in FIG. 13, a floor plan of the first floor and a player list on the first floor are displayed. FIG. 13 illustrates a floor plan in which three signage devices and three fixtures are installed. As illustrated in FIG. 13, icons 1201*a* to 1201*c* corresponding to the signage devices are shown on the floor plan. Simultaneously, icons corresponding to the fixtures 1202*a* to 1202*c* are shown.

Figure 14:
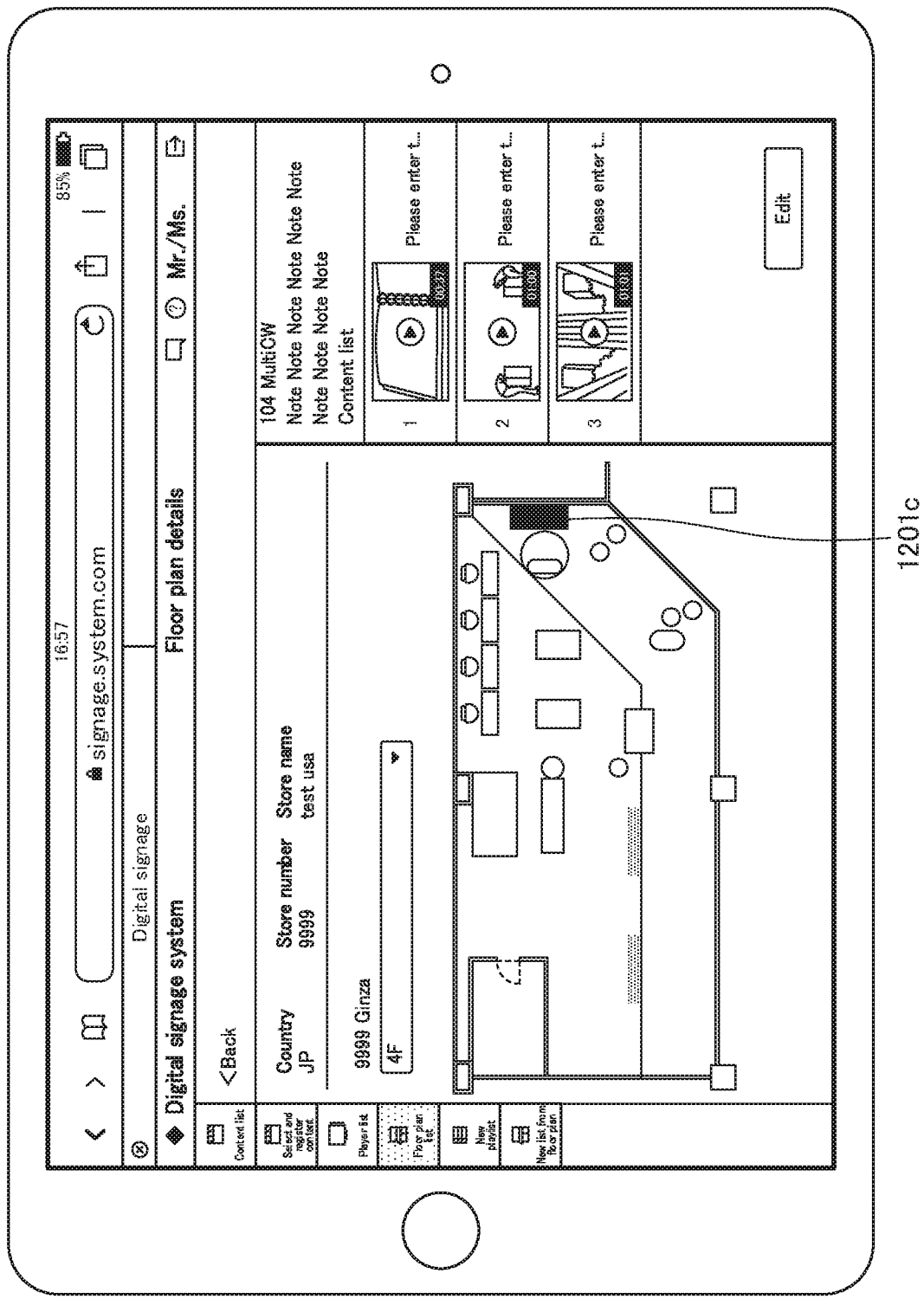
FIG. 14 illustrates a state after a signage device is selected on a floor plan.

Next, when any one of the icons 1201*a* to 1201*c* corresponding to the signage devices on the floor plan is selected, the icon representing the selected signage device is intensified as illustrated in FIG. 14. The intensified icon is, for example, highlighted, enclosed with a frame, or flashing but is not limited to these ways. The icon may be displayed in any way as long as a user can easily recognize the icon on the floor plan. FIG. 14 is a view illustrating a state after a signage device is selected on a floor plan. In FIG. 14, the signage device corresponding to the icon 1201*c* is selected. Accordingly, the display control unit 103 causes a display screen to show a content list set in the signage device selected as an object of interest.

It is preferable that the screen should be changed to another screen for playlist editing. According to Floor plan list mode, it is possible to edit playlists of a signage device with consideration of a store layout.

Furthermore, when a playlist set in a signage device or content included in a playlist on a floor plan is expired or is still not yet available, a warning icon or symbol may be shown at the position of the signage device on the floor plan. As will be described later, it is preferable to enable presetting of content before a distribution time. Accordingly, a playlist after the expiration date and a playlist before the distribution time may be highlighted with different colors for easy identification. Still further, the orientation of the screen of the signage device may be shown by a corresponding icon. Such a display format enables a user to intuitively understand, for example, a date range of a set playlist or content.

Figure 15:
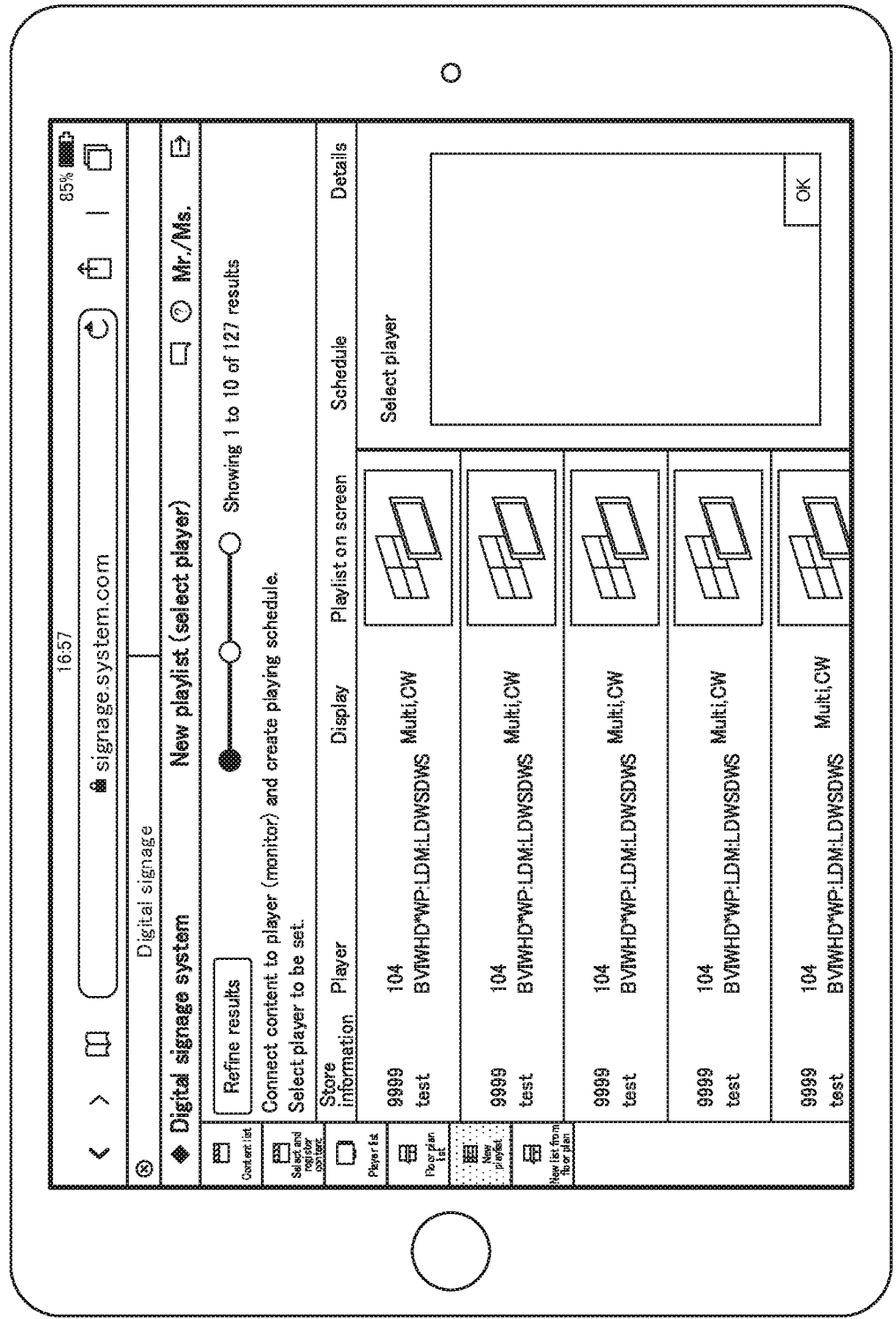
FIG. 15 illustrates an example of a display screen when New playlist mode is selected.

FIG. 15 illustrates an example of a display screen when New playlist mode is selected. When a user selects the operation icon named "New playlist", the mode is changed to New playlist mode. In New playlist mode, it is possible to create a playlist for defining, for example, multiple pieces of content to be shown on a selected signage device, or a signage device of interest, and the playing order of the content.

Figure 16:
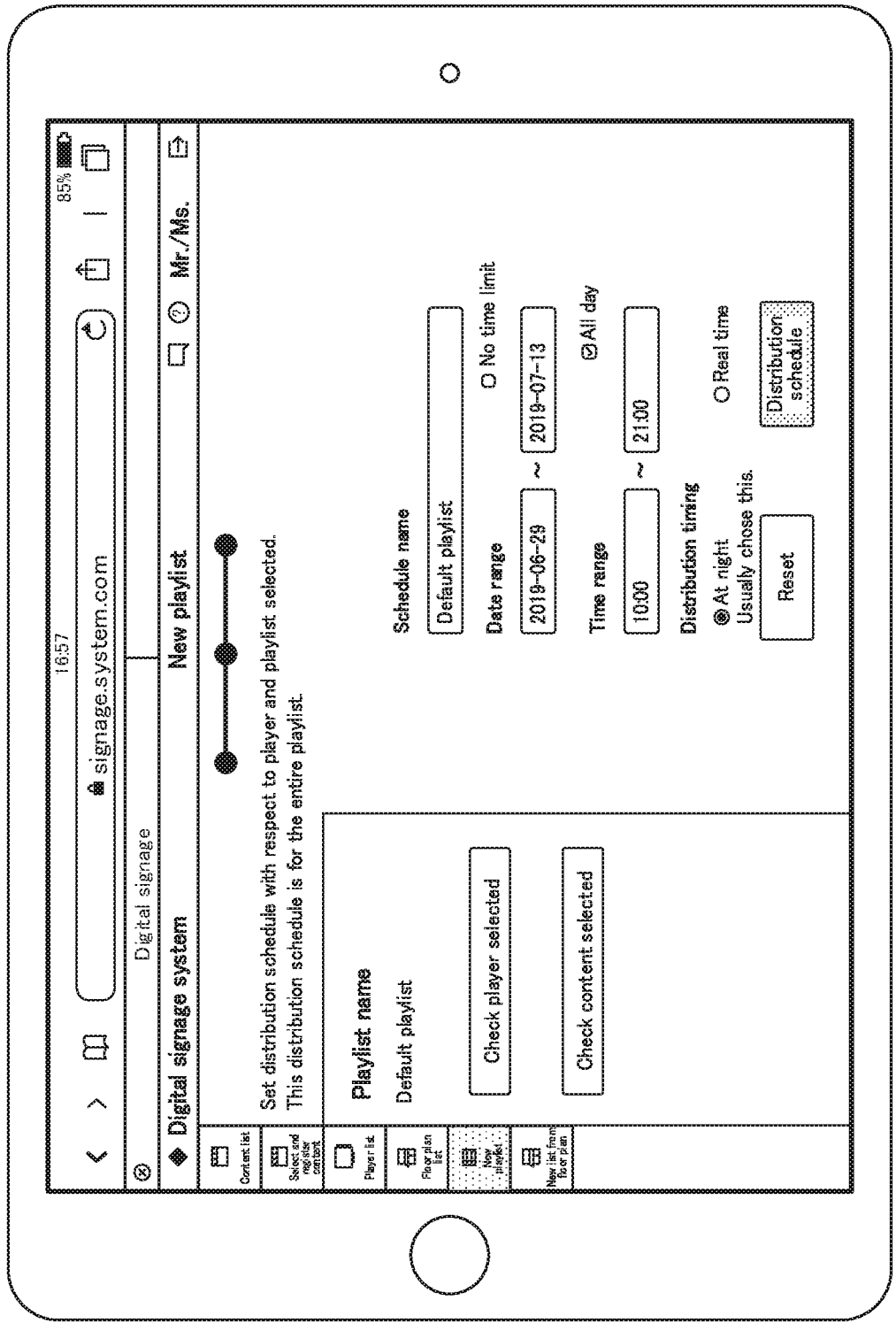
FIG. 16 illustrates an example of a screen according to the fourth embodiment.

In New playlist mode, note that it is possible to set a new playlist before a distribution time. FIG. 16 illustrates an example of a screen for distribution schedule. This is for setting distribution conditions when a new playlist is set in a signage device. In regard to a date range and a time range of playing content on the screen, it is possible to input ranges after the current date and time. When a date range and a time range after the current date and time is input, playing of a set playlist starts on the input date and time. Since a playlist can be set at a date and time earlier than the current date and time, it is possible to enhance the user-friendliness of the signage device.

Figure 17:
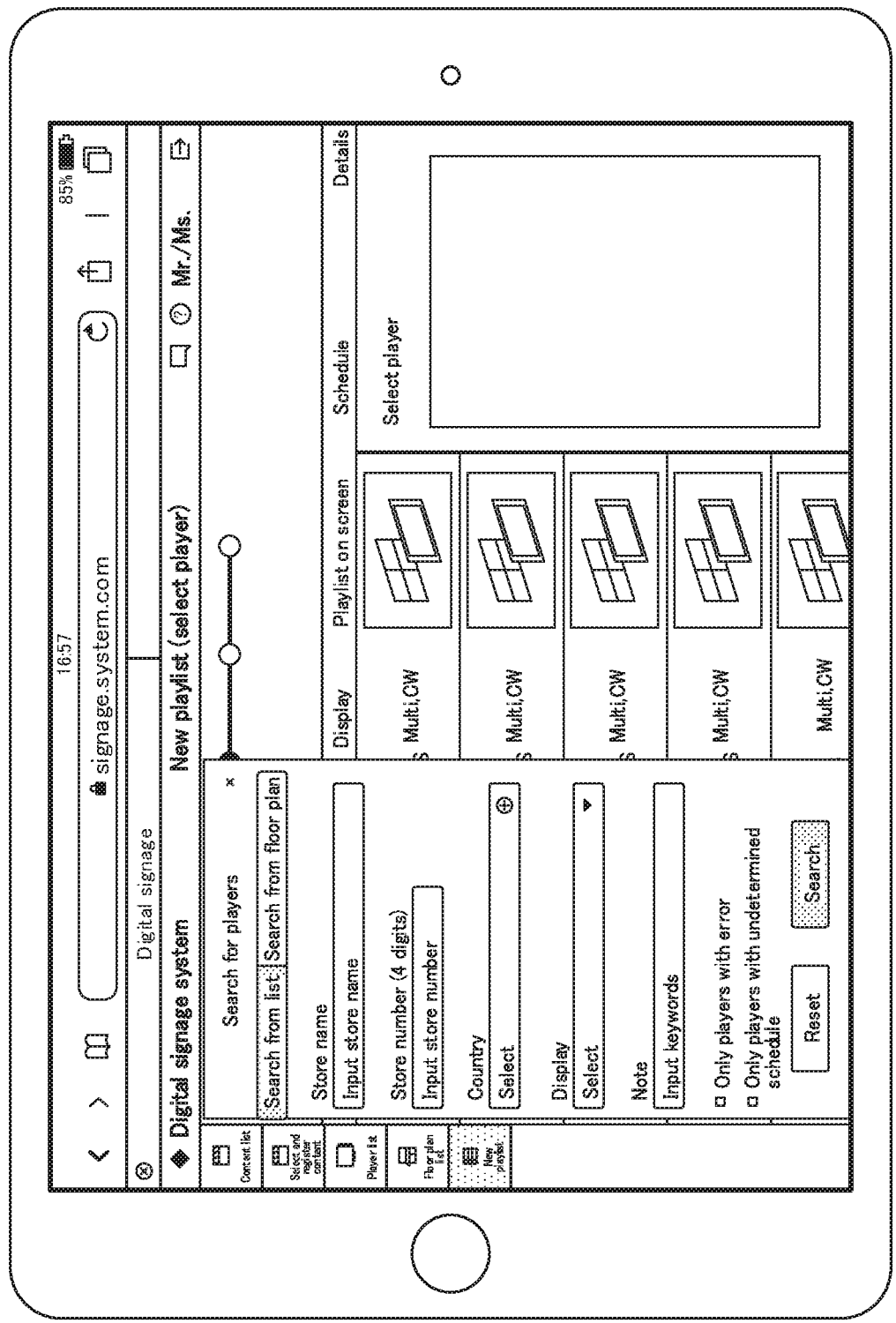
FIG. 17 illustrates an example of a display screen when New list from floor plan mode is selected.

FIG. 17 illustrates an example of a display screen when New list from floor plan mode is selected. When a user selects the operation icon named "New list from floor plan", the mode is changed from New list from floor plan mode. In New list from floor plan mode, it is possible to simultaneously operate a signage device in Floor plan list mode and New playlist mode by screen splitting. New list from floor plan mode enables a user to create a new playlist with consideration of a store layout.

Figure 18:
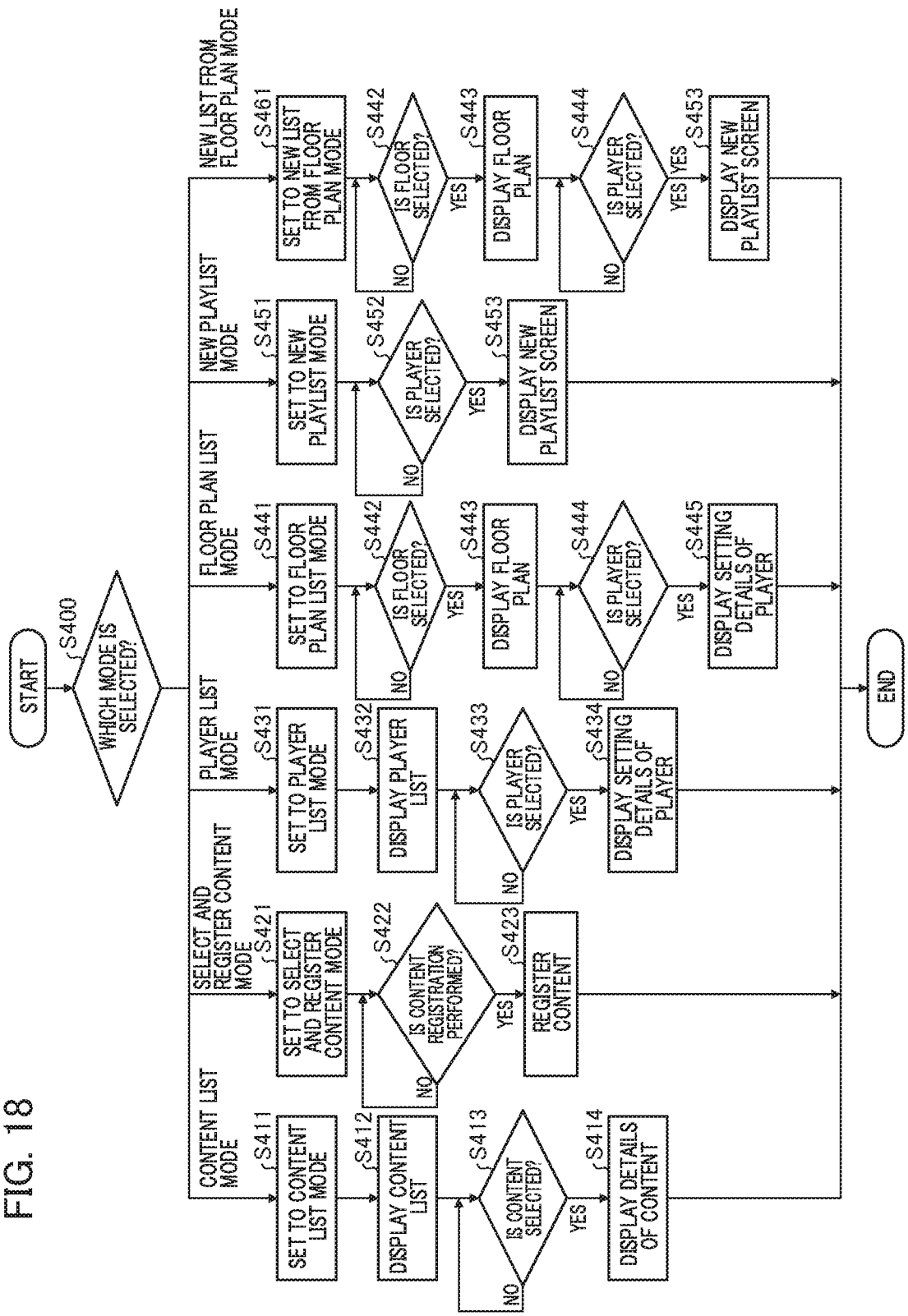
FIG. 18 is a flowchart illustrating an example of processing according to the fourth embodiment.

FIG. 18 is a flowchart illustrating an example of processing according to the fourth embodiment. In S400, the processing unit 105 determines which mode is selected by the input unit 104. When Content list mode is selected, the processing unit 105 sets a signage device to Content list mode (S411). After that, the processing unit 105 transmits an instruction to the display control unit 103 to show the screen of content list, and the display control unit 103 causes the display 102 to show the screen of content list (for example, the screen illustrated in FIG. 8) (S412). The processing unit 105 then determines whether any content in the content list is selected (S413). When content is selected (Yes), the processing unit 105 transmits an instruction to the display control unit 103 to show details of the selected content, and the display control unit 103 causes the display 102 to show the details of the selected content (S414).

Hereinafter described is a case where Select and register content mode is selected in S400. When Select and register content mode is selected, the processing unit 105 sets a signage device to Select and register content mode. The processing unit 105 transmits an instruction to the display control unit 103 to show the display screen of Select and register content mode (for example, the screen illustrated in FIG. 8), and the display control unit 103 causes the display 102 to show the screen (S421). After that, the processing unit 105 determines whether content registration is performed (S422). When the content registration is performed (Yes), the processing unit 105 transmits a file of the registered content to the communication unit 107, and the communication unit 107 transmits the content file to the management apparatus 201 through the network 300. Accordingly, new content is registered in the management center 200 (S423).

Hereinafter described is a case where Player list mode is selected in S400. When Player list mode is selected, the processing unit 105 sets a signage device to Player list mode (S431). After that, the processing unit 105 transmits an instruction to the display control unit 103 to show the screen of player list, and the display control unit 103 causes the display 102 to show the screen of player list (for example, the screen illustrated in FIG. 10) (S432). The processing unit 105 then determines whether any player in the player list is selected (S433). When a player is selected (Yes), the processing unit 105 transmits an instruction to the display control unit 103 to show details of the selected player, and the display control unit 103 causes the display 102 to show the screen of the details (for example, the screen illustrated in FIG. 11) (S434).

Hereinafter described is a case where Floor plan list mode is selected in S400. When Floor plan list mode is selected, the processing unit 105 sets a signage device to Floor plan list mode. The processing unit 105 transmits an instruction to the display control unit 103 to show the display screen of Floor plan list mode (for example, the screen illustrated in FIG. 12), and the display control unit 103 causes the display 102 to show the screen. (S441). The processing unit 105 then determines whether any floor plan in the floor plan list is selected (S442). When a floor plan is selected (Yes), the processing unit 105 transmits an instruction to the display control unit 103 to show the selected floor plan, and the display control unit 103 causes the display 102 to show the screen of the floor plan (for example, the screen illustrated in FIG. 13) (S443). The processing unit 105 then determines whether any player in the floor plan is selected (S444). When a player is selected (Yes), the processing unit 105 transmits an instruction to the display control unit 103 to show details of the selected player, and the display control unit 103 causes the display 102 to show the screen of the details (for example, the screen illustrated in FIG. 14) (S445).

Hereinafter described is a case where New playlist mode is selected in S400. When New playlist mode is selected, the processing unit 105 sets a signage device to New playlist mode. The processing unit 105 transmits an instruction to the display control unit 103 to show the display screen of New playlist mode (for example, the screen illustrated in FIG. 15), and the display control unit 103 causes the display 102 to show the screen. (S451). The processing unit 105 then determines whether any player in the screen is selected (S452). When a player is selected (Yes), the processing unit 105 transmits an instruction to the display control unit 103 to show the screen for creating a new playlist of the selected player, and the display control unit 103 causes the display 102 to show the screen (S453).

Hereinafter described is a case where New list from floor plan mode is selected in S400. When New list from floor plan mode is selected, the processing unit 105 sets a signage device to New list from floor plan mode. The processing unit 105 transmits an instruction to the display control unit 103 to show the display screen of New list from floor plan mode (for example, the screen illustrated in FIG. 17), and the display control unit 103 causes the display 102 to show the screen (S461). After that, the steps S442, S443, S444, and S453 are performed.

In this manner, the information processing apparatus 101 offers one or more modes, which makes it easier for a user to operate the apparatus.

Fifth Embodiment

In this embodiment, an image or the like is displayed on a display 102 to enable a user to intuitively understand various kinds of information such as details of each signage device and playlists in a displayed floor plan. For example, an icon or a symbol representing details of a signage device is superimposed and displayed on an icon representing the signage device. A method for displaying such an icon or a symbol is not limited to superimposition for display. Any display method may be employed as long as a user can understand which signage device is related to the icon or the symbol. Note that similar components to those described in the aforementioned embodiments are denoted by the same reference numerals and the description thereof will be omitted.

Figure 19:
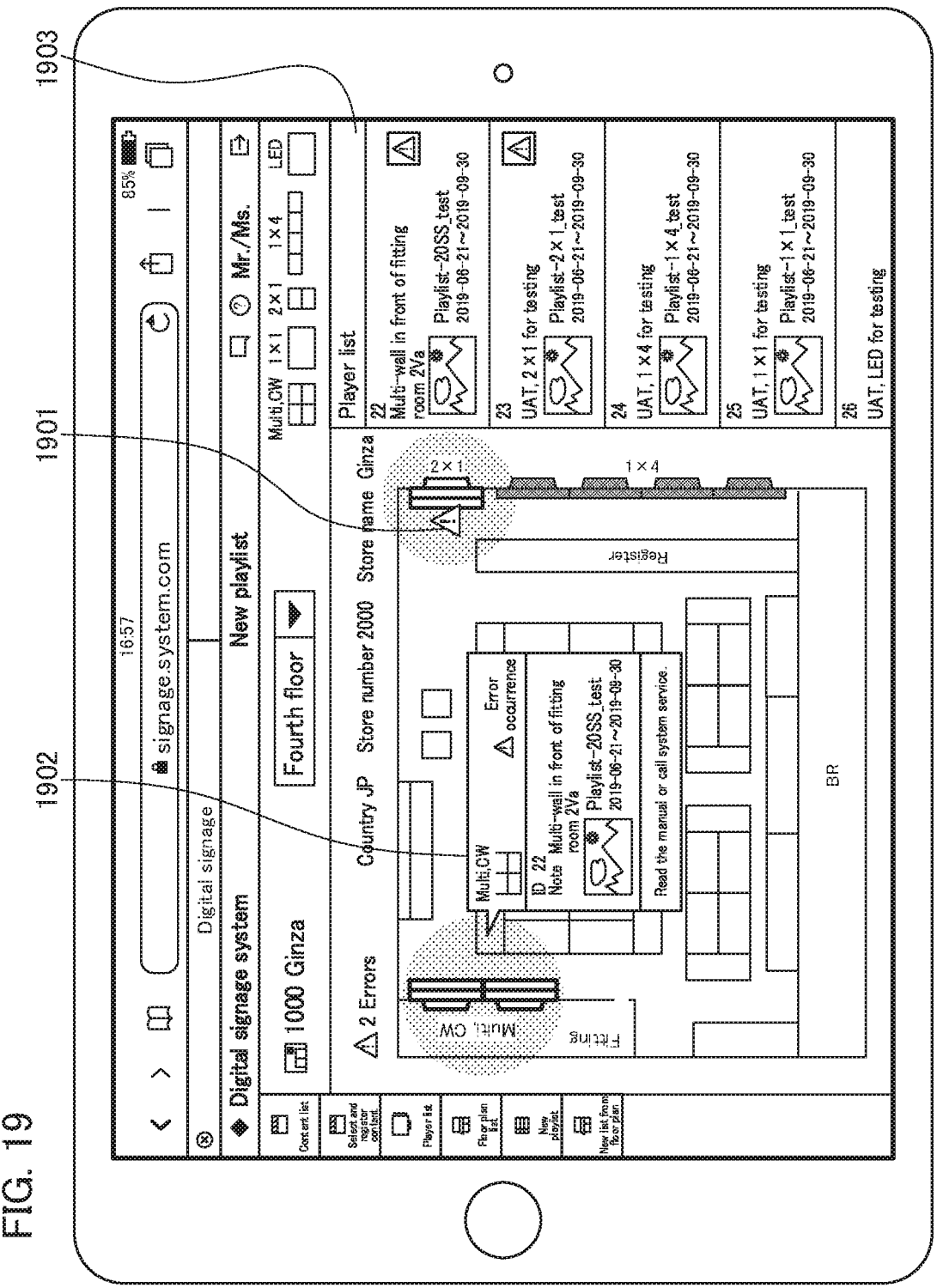
FIG. 19 illustrates an example of a display screen when an error occurs in a signage device.

For example, when there is an error in any signage device included in the displayed floor plan, an icon or a symbol representing the occurrence of an error (hereinafter referred to as "error display icon") is superimposed and displayed on an icon corresponding to the signage device. FIG. 19 illustrates an example of a display screen when an error occurs in a signage device. As illustrated in FIG. 19, an error display icon 1901 is superimposed and displayed on an icon corresponding to a signage device with an error. It is more preferable that the icon corresponding to the signage device with an error should be intensified. Such a display format makes it possible for a user to intuitively understand which signage device contains an error.

Furthermore, for example, when a user touches the icon corresponding to the signage device with an error, a detail-of-error 1902 is displayed on the screen. The detail-of-error 1902 includes, for example, details of position of the signage device in a store, the display size of the signage device, the type of the signage device, the name of a set playlist, a recommended way to deal with an error, and a status. Note that the detail-of-error 1902 does not necessarily include all of these details and may include any one or a combination thereof. This enables a user to quickly deal with an error.

Alternatively, a player list 1903 included in a floor plan may be displayed together with the floor plan. When there is an error in a signage device, it is preferable to display the signage device with an error at the top of the screen so as to enable a user to easily understand the player with an error.

In addition, when an error is occurred in any signage device, the number of errors (the number of signage devices with an error) may be displayed on the screen. This makes it possible for a user to understand the number of errors instantaneously.

Figure 20:
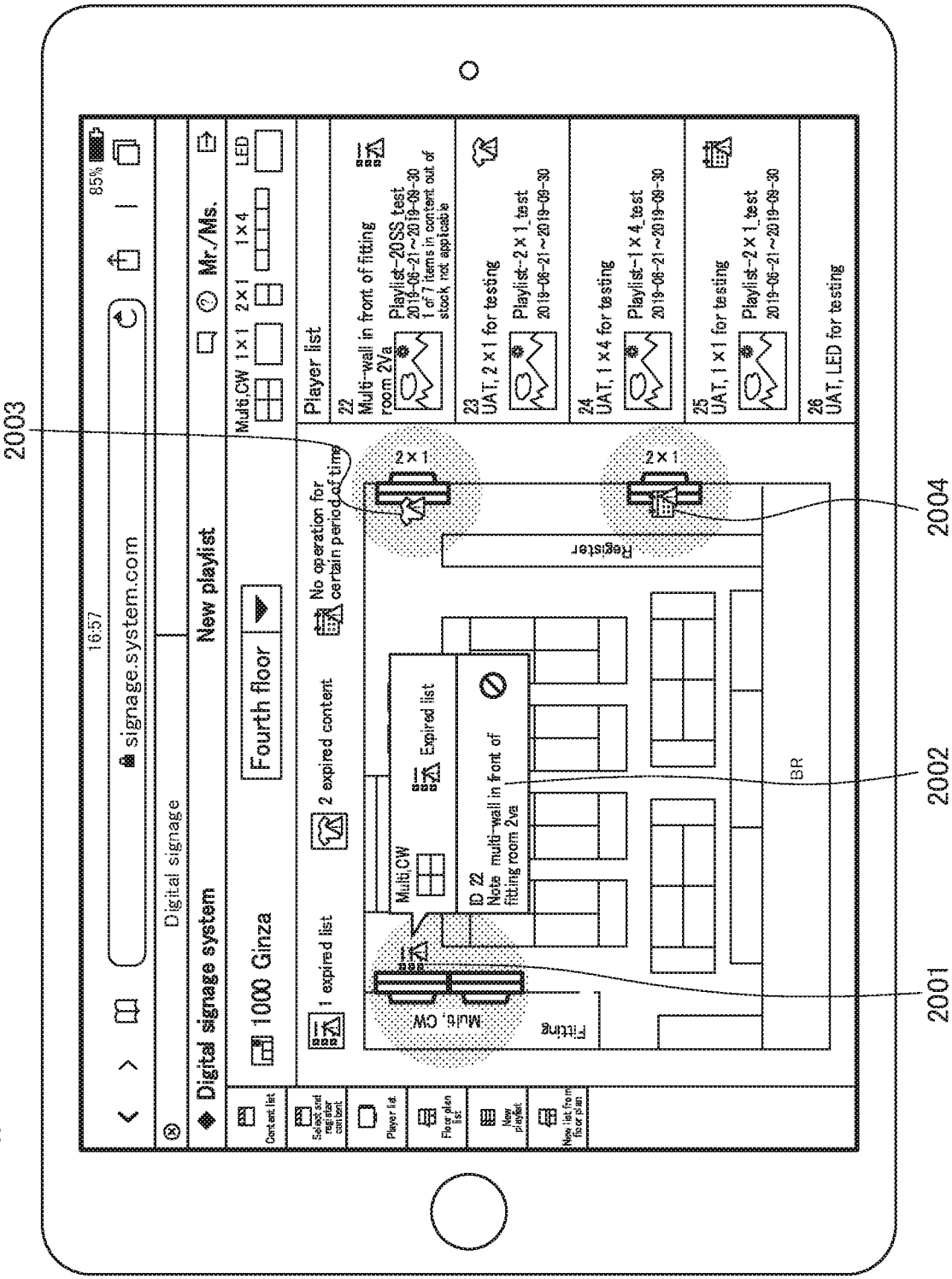
FIG. 20 illustrates an example of a display screen with an expired playlist.

Hereinafter described is an example of a display screen with a set playlist expired. FIG. 20 illustrates an example of a display screen with an expired playlist. As illustrated in FIG. 20, an icon 2001 representing the expiration of a set playlist is superimposed and displayed on an icon corresponding to a signage device with a set playlist expired. Such a display format makes it possible for a user to intuitively understand which signage device needs a new playlist to be set.

Furthermore, for example, when a user touches the icon corresponding to the signage device with the set playlist expired, a detail 2002 is displayed on the screen. The detail 2002 includes, for example, details of position of the signage device in a store, the display size of the signage device, the type of the signage device, the name of the set playlist, and the date range of the playlist. Note that the detail 2002 does not necessarily include all of these details and may include any one or a combination thereof.

Similarly, when a playlist includes expired content, an icon 2003 representing the expiration of content may be superimposed on an icon of a corresponding signage device. Furthermore, for example, when a user touches the icon corresponding to the signage device including the set playlist with the expired content, details are displayed on the screen. The details include, for example, details of position of the signage device in a store, the display size of the signage device, the type of the signage device, the name of the set playlist, names or the like of the expired content, and the number of pieces of the expired content. Note that the details do not necessarily include all of these details and may include any one or a combination thereof.

Similarly, when there is a signage device which has not been configured for a certain period of time in a store, an icon 2004 representing that no operation has been performed for a certain period of time is superimposed on an icon of the corresponding signage device. Furthermore, for example, when a user touches the icon corresponding to the signage device which has not been configured for a certain period of time, details are displayed on the screen. The details include, for example, details of position of the signage device in a store, the display size of the signage device, the type of the signage device, the name of the set playlist, and the time and date of the last operation. Note that the details do not necessarily include all of these details and may include any one or a combination thereof.

Such a display format enables a user to promptly change or update playlists according to set date ranges of playing content or final operation time.

Figure 21:
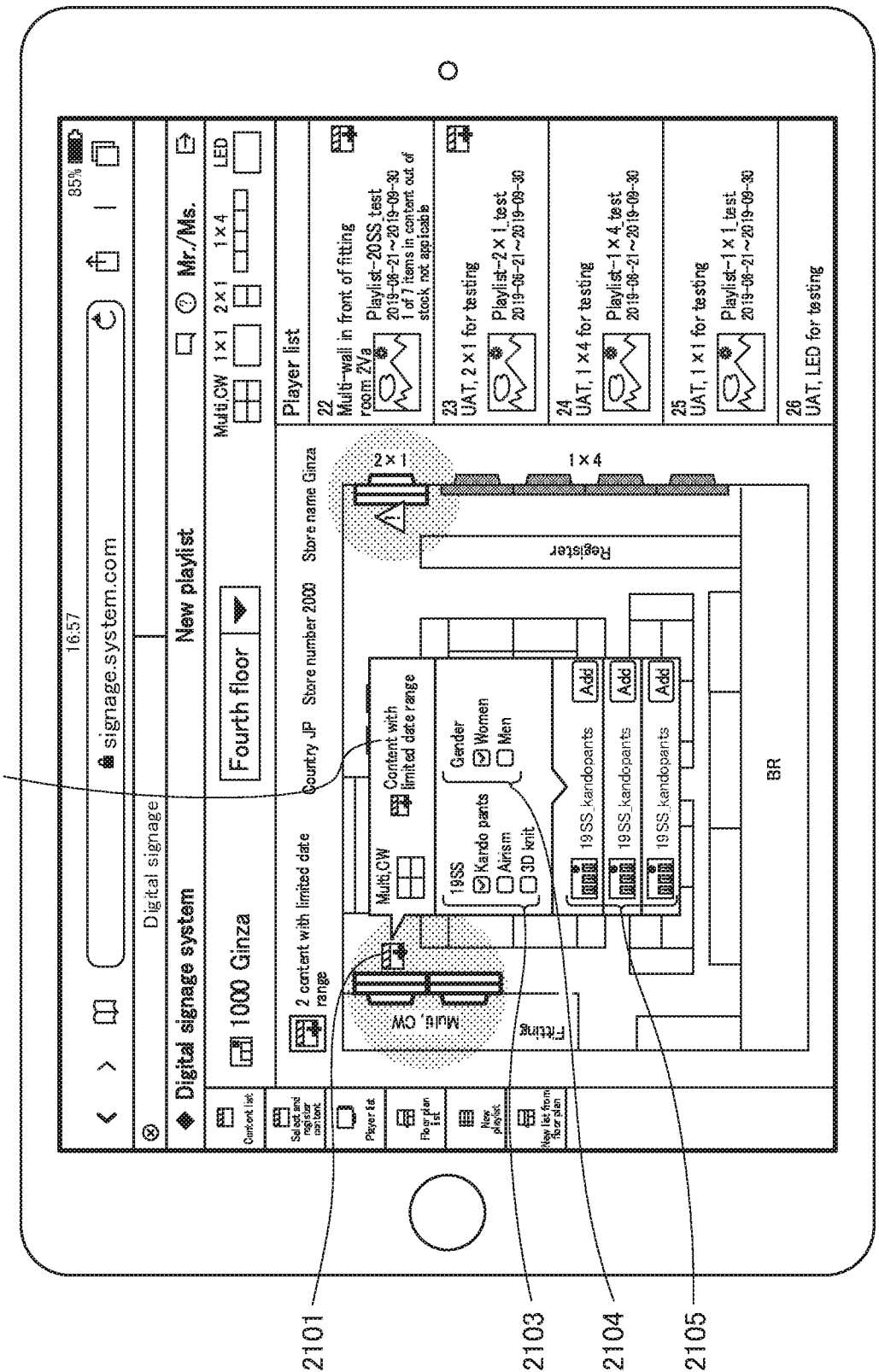
FIG. 21 illustrates an example of a display screen with a set playlist or content being about to expire.

Hereinafter described is an example of a display screen with a set playlist or content being about to expire. FIG. 21 illustrates an example of a display screen with a set playlist or content being about to expire. As illustrated in FIG. 21, an icon 2101 representing the impending expiration date of the set playlist or content is superimposed and displayed on an icon corresponding to a signage device including a set playlist or content being about to expire. Such a display format makes it possible for a user to intuitively understand which signage device needs a new playlist to be set. Note that timings for displaying the icon 2101 may be determined by initial setting but is preferably changeable by a user.

Furthermore, a detail 2102 is displayed, for example, when a user touches an icon corresponding to the signage device including the set playlist or content being about to expire. The detail 2102 includes, for example, details of position of the signage device in a store, the display size of the signage device, the type of the signage device, the name of the set playlist, and the date range of the playlist. Note that the detail 2102 does not necessarily include all of these details and may include any one or a combination thereof.

In addition, the display of the detail 2102 can be used to edit or modify the playlist, or to add content to the playlist. For example, the detail 2102 include a product name option 2103 and a gender type option 2104 which are used when a user select content to be added. In the figure, "Kando pants" is selected from the product name option 2103. In addition, "Women" is selected from the gender type option 2104. In this case, content associated with Kando pants for women is displayed as a candidate 2105. From the candidate 2105, for example, a user touches "add" tab of content to add the content to the playlist. Accordingly, new content is added to the playlist. Similarly, the playlist may be displayed as the candidate 2105.

According to the above description, a user can promptly change or update a playlist or add content according to the end of a date range of playing the playlist or content.

Figure 22:
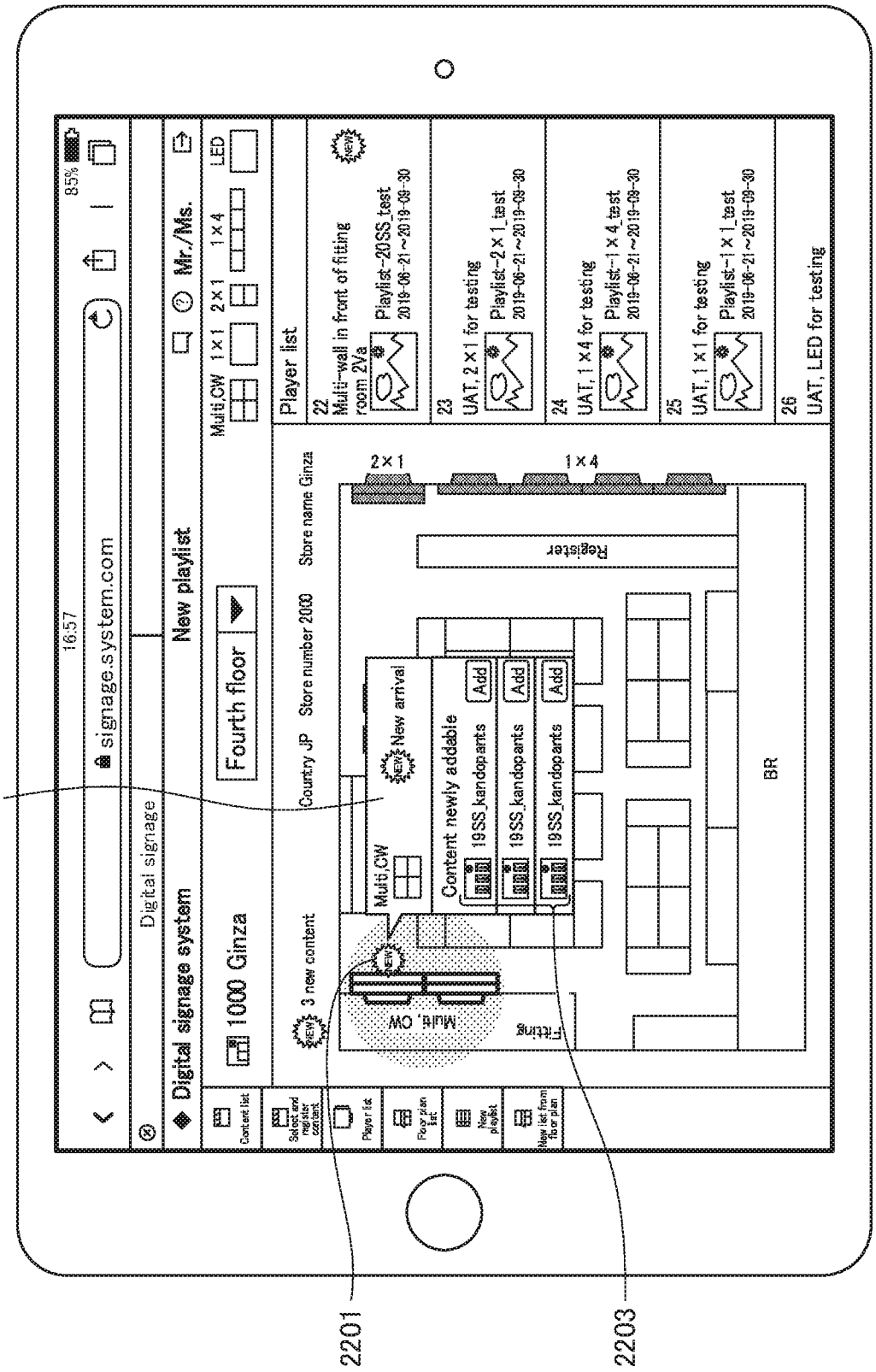
FIG. 22 illustrates an example of a display screen when new content is added to a management center.

Hereinafter described is an example of a display screen when new content is added to the management center 200. FIG. 22 illustrates an example of a display screen when new content is added to the management center 200. When new content is added to the management center 200, an icon 2201 representing the addition of new content to be played is superimposed and displayed on an icon corresponding to a signage device with a monitor size that can play the new content. Such a display format enables a user to intuitively understand a signage device in which newly added content can be set.

Furthermore, for example, when a user touches the icon corresponding to the signage device having the monitor size that can play the new content, a detail 2202 is displayed on the screen. The detail 2202 includes, for example, the display size of the signage device, the type of the signage device, and details of the newly added content. Note that the detail 2202 does not necessarily include all of these details and may include any one or a combination thereof. The detail 2202 can be used to add content. When new content is added, the new content is displayed as a candidate 2203. From the candidate 2203, for example, a user touches "add" tab of content to add content to the playlist. Accordingly, new content is added to the playlist. Note that, for example, when a new playlist is added to the management center 200, the set playlist can be changed in a similar manner.

According to the above description, it is possible to quickly display newly added content or the like on a signage device while considering store layout.

Figure 23:
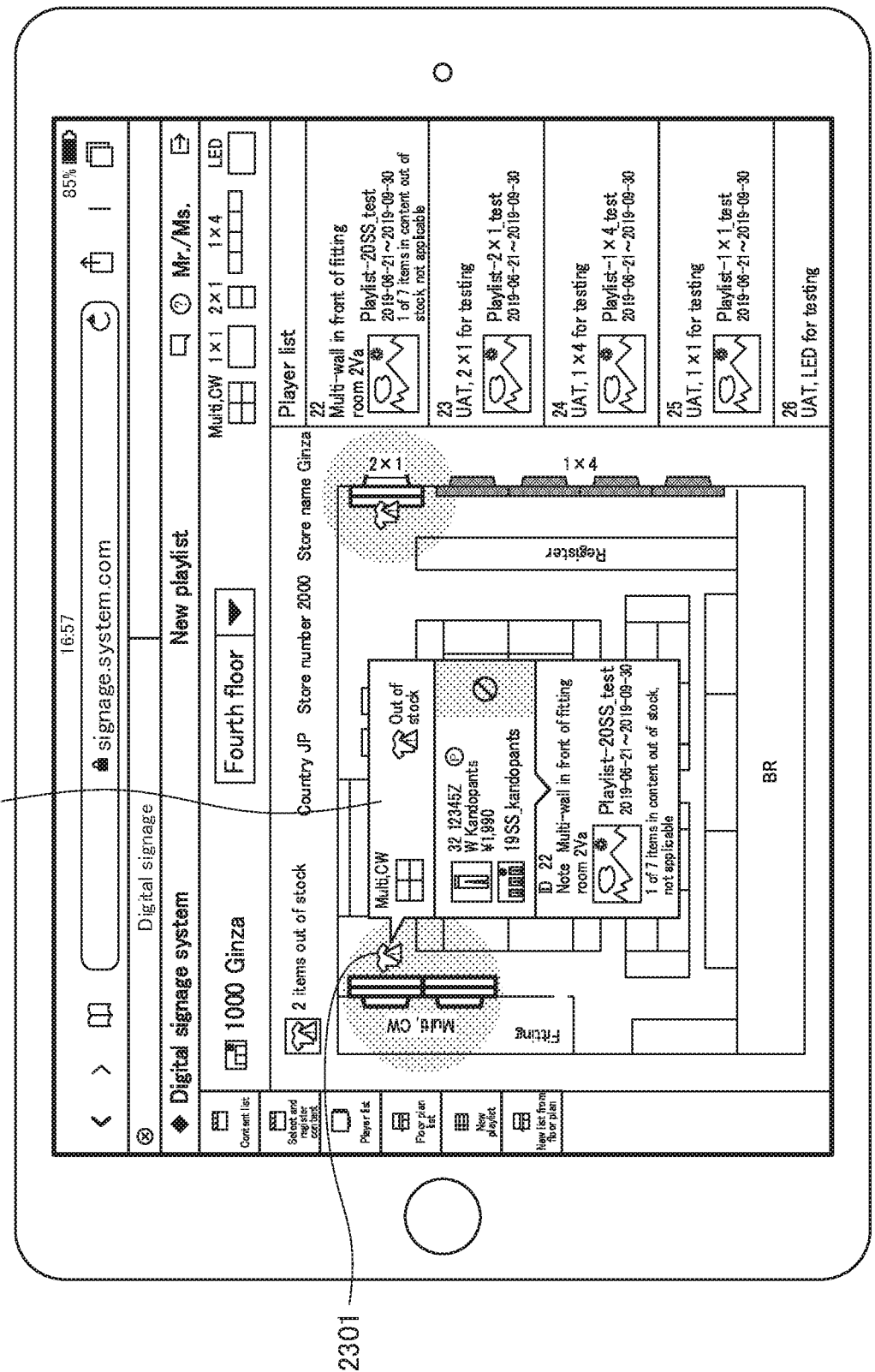
FIG. 23 illustrates an example of a display screen when configuration details in a signage device includes content associated with out-of-stock products.

Hereinafter described is an example of a display screen when a set playlist or content includes those associated with out-of-stock products. FIG. 23 illustrates an example of a display screen when configuration details in a signage device includes content associated with out-of-stock products. As illustrated in FIG. 23, an icon 2301 representing the inclusion of content associated with out-of-stock products is superimposed and displayed on an icon corresponding to the signage device including the content associated with out-of-stock products in the configuration details. Such a display format enables a user to intuitively understand a signage device which is playing the content associated with out-of-stock products.

Furthermore, for example, when a user touches the icon corresponding to the signage device which is playing the content associated with out-of-stock products, a detail 2302 is displayed on the screen. The detail 2302 includes, for example, details of position of the signage device in a store, the display size of the signage device, the type of the signage device, the name of the set playlist, names or the like of out-of-stock products, and details or the like of content associated with the out-of-stock products included in configuration details. Note that the detail 2302 does not necessarily include all of these details and may include any one or a combination thereof.

At this time, the processing unit 105 may be configured not to automatically play the content associated with out-of-stock products. When an out-of-stock product arrives after the signage device is controlled not to play the content associated with out-of-stock products automatically or based on an input from the input unit 104, it is preferable that the play of the content should be automatically resumed or an icon representing the arrival of the product should be superimposed on the icon corresponding to the signage device. Such a configuration makes it possible to plat content according to stock status.

Signage devices installed in a store have various monitor sizes and types depending on installation locations. Furthermore, content to be played may differ depending on sizes and types of monitors. Therefore, hereinafter described is an example in which a display screen is shown to enable a user to intuitively understand which size of a monitor is installed in which position in a store in a displayed floor plan.

Figure 24:
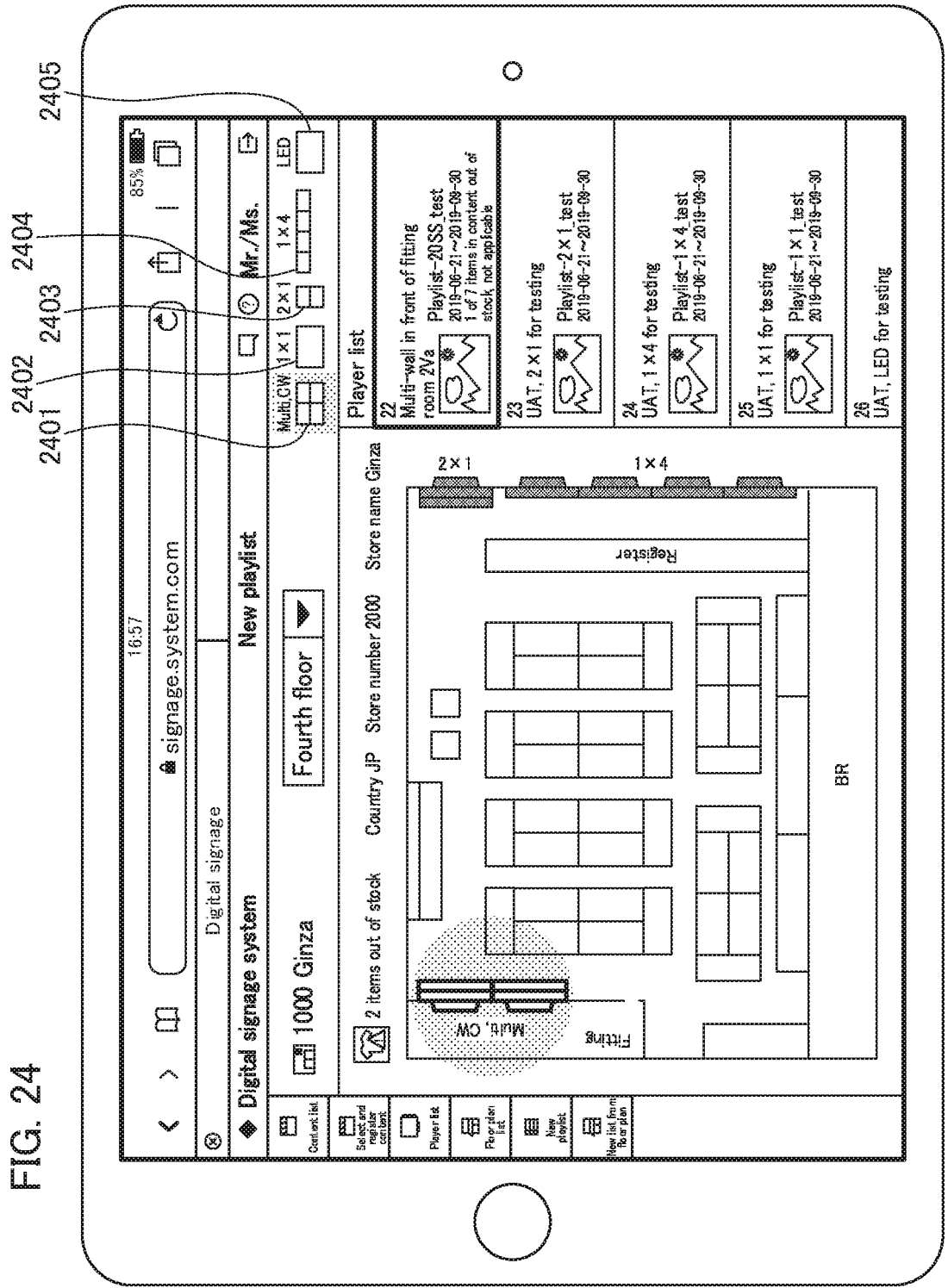
FIG. 24 illustrates an example of a display screen when a predetermined type of monitor is selected.

FIG. 24 illustrates an example of a display screen when a predetermined type of monitor is selected. As illustrated in FIG. 24, icons 2401 to 2405 representing types of monitors are displayed on the screen. The icons represent signage devices with monitors having different types or sizes. Assumed that a user selects the icon 2401 with the input unit 104. An icon representing a signage device with a monitor having the type and size corresponding to the icon 2401 is intensified. This makes it possible for a user to intuitively understand that a signage device including a monitor having the selected type or size is installed at which position in a store.

Other Embodiments

Embodiments of the present application have been described in detail based on corresponding drawings, but the aforementioned embodiments are for purposes of illustration and not limitation of the present invention. The present invention can be implemented in a variety of forms without departing from the spirit of the invention. For example, according to configurations in an information processing apparatus 101, content files and playlists corresponding to the configurations may be directly transmitted from the information processing apparatus 101 to a signage control device 112.

When a computer is used to perform processing in the information processing apparatus 101, details of functional processing to be performed by each unit in the apparatus are executed based on a program. The program including the details of functional processing can be recorded in a non-transitory computer-readable storage medium. Examples of the computer-readable storage medium include a magnetic recording device, an optical disk, a magneto-optical recording medium, and a semiconductor memory. Furthermore, the processing of each unit may be performed by executing a predetermined program on a computer.

What is claimed is:

1. An information processing apparatus for configuring a signage device, the information processing apparatus comprising:
    an acquisition unit configured to acquire layout information including position information of at least one signage device in a store that sells a product and a floor plan of the store which enables identification of placement of at least one fixture that displays the product and is placed in the store, and content information associated with content to be displayed on the signage device; and
    a display control unit configured to show an icon corresponding to the signage device at a position corresponding to the position information in the floor plan of the store,
    wherein, when the display control unit receives a selection of the icon from a user, the display control unit shows content information set in the signage device or shows content information to be set in the signage device,
    wherein the acquisition unit acquires information associated with the product placed in the store, and
    the display control unit superimposes a candidate of content to be displayed on the signage device, the candidate being determined based on a positional relation between the signage device and the product placed in the store.

2. The information processing apparatus according to claim 1, wherein the display control unit superimposes the content information on the layout information for display.

3. The information processing apparatus according to claim 1,
    wherein the acquisition unit acquires product availability information, and
    the display control unit shows a candidate of content to be shown on the signage device, the candidate being determined based on the product availability information.

4. The information processing apparatus according to claim 3, wherein the display control unit superimposes content associated with an in-stock product as the candidate.

5. The information processing apparatus according to claim 1, wherein the display control unit prepares a candidate list of content to be displayed on the signage device and superimposes the candidate list as the content information.

6. The information processing apparatus according to claim 1, wherein the content information includes at least one of a symbol, an image, and a video.

7. The information processing apparatus according to claim 1, further comprising
    a display,
    wherein the display control unit causes the display to show the content information in association with position information of the signage device.

8. A non-transitory computer readable storage medium storing a control program for making a computer function as each unit of an information processing apparatus for configuring a signage device,
    the information processing apparatus comprising:
    an acquisition unit configured to acquire layout information including position information of at least one signage device in a store that sells a product and a floor plan of the store which enables identification of placement of at least one fixture that displays the product and is placed in the store, and content information associated with content to be displayed on the signage device; and
    a display control unit configured to show an icon corresponding to the signage device at a position corresponding to the position information in the floor plan of the store,
    wherein, when the display control unit receives a selection of the icon from a user, the display control unit shows content information set in the signage device or shows content information to be set in the signage device, wherein the acquisition unit acquires information associated with the product placed in the store, and the display control unit superimposes a candidate of content to be displayed on the signage device, the candidate being determined based on a positional relation between the signage device and the product placed in the store.

9. An information processing method for configuring a signage device, the method comprising:

acquiring layout information including position information of at least one signage device in a store that sells a product and a floor plan of the store which enables identification of placement of at least one fixture that displays the product and is placed in the store, and content information associated with content to be displayed on the signage device; and displaying an icon corresponding to the signage device at a position corresponding to the position information in the floor plan of the store, wherein, in the displaying, when a selection of the icon is received from a user, content information set in the signage device or content information to be set in the signage device is displayed, wherein the acquisition unit acquires information associated with the product placed in the store, and the display control unit superimposes a candidate of content to be displayed on the signage device, the candidate being determined based on a positional relation between the signage device and the product placed in the store.

10. A signage system configured to cause a signage device to display content, the signage system comprising:

a management apparatus configured to output layout information including position information of at least one signage device in a store that sells a product and a floor plan of the store which enables identification of placement of at least one fixture that displays the product and is placed in the store, and content information to be displayed on the signage device; and an information processing apparatus for configuring the signage device, the information processing apparatus comprising:

an acquisition unit configured to acquire the layout information and the content information; and a display control unit configured to show an icon corresponding to the signage device at a position corresponding to the position information in the floor plan of the store, wherein, when the display control unit receives a selection of the icon from a user, the display control unit shows content information set in the signage device or shows content information to be set in the signage device, wherein the acquisition unit acquires information associated with the product placed in the store, and the display control unit superimposes a candidate of content to be displayed on the signage device, the candidate being determined based on a positional relation between the signage device and the product placed in the store.

* * * * *